United States Patent
Rahman et al.

(10) Patent No.: US 7,262,536 B2
(45) Date of Patent: Aug. 28, 2007

(54) GEARLESS WHEEL MOTOR DRIVE SYSTEM

(75) Inventors: Khwaja M. Rahman, Torrance, CA (US); Silva Hiti, Redondo Beach, CA (US); Nitinkumar R. Patel, Cypress, CA (US); Terence G. Ward, Redondo Beach, CA (US); James M. Nagashima, Cerritos, CA (US); Fabio Crescimbini, Rome (IT); Federico Caricchi, Rome (IT)

(73) Assignee: General Motors Corporation, Detroit, MI (US)

( * ) Notice: Subject to any disclaimer, the term of this patent is extended or adjusted under 35 U.S.C. 154(b) by 215 days.

(21) Appl. No.: 10/903,929

(22) Filed: Jul. 29, 2004

(65) Prior Publication Data

US 2005/0035676 A1 Feb. 17, 2005

Related U.S. Application Data

(60) Provisional application No. 60/494,249, filed on Aug. 11, 2003, provisional application No. 60/494,250, filed on Aug. 11, 2003, provisional application No. 60/494,251, filed on Aug. 11, 2003.

(51) Int. Cl.
  *H02K 21/12* (2006.01)
(52) U.S. Cl. ............... 310/156.35; 310/266; 310/268; 180/65.5; 180/65.6
(58) Field of Classification Search .................
  310/156.32–156.37, 266, 268, 67 A, 75 C; 180/65.5, 65.6
  See application file for complete search history.

(56) References Cited

U.S. PATENT DOCUMENTS 4,319,152 A * 3/1982 van Gils ............... 310/201
4,578,610 A * 3/1986 Kliman et al. ......... 310/156.35
4,719,377 A * 1/1988 Horie et al. ................ 310/44

(Continued)

FOREIGN PATENT DOCUMENTS

EP 0533359 8/1992

OTHER PUBLICATIONS

Caricchi et al., "Experimental Study on Reducing Cogging Torque and Core Power Loss in Axial-Flux Permanent-Magnet Machines with Slotted Winding", JEEE, 2002, pp. 1295-1302.
Caricchi et al., "Three-Wheeled Electric Maxi-Scooter for Improved Driving Performances in Large Urban Areas", IEEE, Feb., 2003, pp. 163-1368.

(Continued)

*Primary Examiner*—Dang Le
(74) *Attorney, Agent, or Firm*—Christopher DeVries

(57) ABSTRACT

Methods and apparatus are provided for an electric vehicle embodying an axial flux traction motor directly coupled to a wheel thereof. The fraction motor includes a stator having coils for producing a magnetic field, an annular rotor magnetically coupled to the stator and mechanically to an output shaft Permanent magnets of alternating polarity are mounted on the annular rotor. Magnetic shunts bridge a portion of the stator slots above the coils. The magnets are arranged in groups with group-to-group spacing exceeding magnet-to-magnet spacing. Adjacent edges of the magnets diverge. The method comprises, looking up d- and q-axis currents to provide the requested torque and motor speed for the available DC voltage, combining at least one of the d- and q-axis currents with a field weakening correction term, converting the result from synchronous to stationary frame and operating an inverter therewith to provide current to the coils of the motor.

31 Claims, 22 Drawing Sheets

U.S. PATENT DOCUMENTS 5,272,938 A * 12/1993 Hsu et al. .................. 74/594.1
5,744,896 A * 4/1998 Kessinger et al. .......... 310/268
6,703,742 B1 * 3/2004 Brandley et al. ...... 310/156.32
6,710,494 B2 * 3/2004 Hatz et al. ............ 310/156.53
6,727,632 B2 * 4/2004 Kusase ...................... 310/266

OTHER PUBLICATIONS

Huang et al., Torus Concept Machines: Pre-Prototyping Design Assessment for Two Major Topologies, Industry Applications Conference, Thirty-Sixth IAS Annual Meeting, Conference record of the 2201 IEEE (2001), vol 3: 619-1625.

* cited by examiner

GEARLESS WHEEL MOTOR DRIVE SYSTEM

CROSS-REFERENCES TO RELATED APPLICATIONS

This application claims the benefit of U.S. Provisional Applications Nos. 60/494,249; 60/494,250; and 60/494,251, all filed on Aug. 11, 2003.

TECHNICAL FIELD

The present invention generally relates to electric vehicle (EV), fuel cell electric vehicle (FCEV), or hybrid electric vehicle (HEV) propulsion systems. More specifically, the present invention relates to electric traction motors and controls therefore, for use in EVs, FCEVs and/or HEVs where the motor directly drives the wheel.

BACKGROUND

There exist a variety of electric propulsion or drive technologies used to power vehicles. The technologies include electric traction motors such as DC motors, AC induction motors, switched reluctance motors, synchronous reluctance motors, brushless DC motors and corresponding power electronics for controlling the motors. In the prior art, it has been common to couple the traction motor(s) to the front or rear wheels of the vehicle using a mechanical drive-line with reduction gears and a differential. Sometimes, the motors are mounted in the driving wheels without a differential and coupled to the wheels through speed reduction gears. While such systems are functional, they suffer from higher weight, lower reliability and lower efficiency due to the mechanical drive-line (gears, differentials, transmissions, etc.) between the motor(s) and the wheels.

Accordingly, there is an ongoing need to provide traction motors and control systems for EV, FCEV, and HEV application that do not require use of a differential or reduction gears. In addition, it is desirable to provide such traction motors having a form suitable for inclusion directly in or adjacent to a vehicle wheel. It is further desirable that such motors employ permanent magnets for good efficiency and high torque density. Other desirable features and characteristics of the present invention will become apparent from the subsequent detailed description and the appended claims, taken in conjunction with the accompanying drawings and the foregoing technical field and background.

BRIEF SUMMARY

An apparatus is provided for an electric vehicle embodying an axial flux traction motor directly coupled to a wheel thereof. The traction motor comprises a stator having coils for producing a magnetic field, an annular rotor magnetically coupled to the stator and mechanically coupled to an output shaft. Permanent magnets of alternating polarity are mounted on the annular rotor facing the stator. Magnetic shunts bridge a portion of the stator slots above the coils. The magnets are preferably arranged in two or more groups with group-to-group spacing desirably exceeding magnet-to-magnet spacing. Adjacent edges of the permanent magnets preferably diverge.

A method is provided for operating a traction motor for an electric vehicle. The method comprises looking up optimized d- and q-axis stator currents to provide the requested torque and motor speed for the available DC voltage, combining at least one of the d- and q-axis currents with a field weakening correction term to take into account differences between the optimized stored motor parameters and actual motor parameters for optimized behavior, converting the corrected d- and q-axis currents from synchronous to stationary frame and operating an inverter therewith to provide drive currents to the coils of the motor.

BRIEF DESCRIPTION OF THE DRAWINGS

The present invention will hereinafter be described in conjunction with the following drawing figures, wherein like numerals denote like elements.

FIGS. 13A–13B are simplified plan views of a segment of a stator and stator support of the traction motor of the present invention, wherein FIG. 13A shows the stator and stator support separated and FIG. 13B shows them assembled;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The terms "motor" and "machine" are used interchangeably herein to refer to the traction motor/generator of the present invention.

Figure 1:
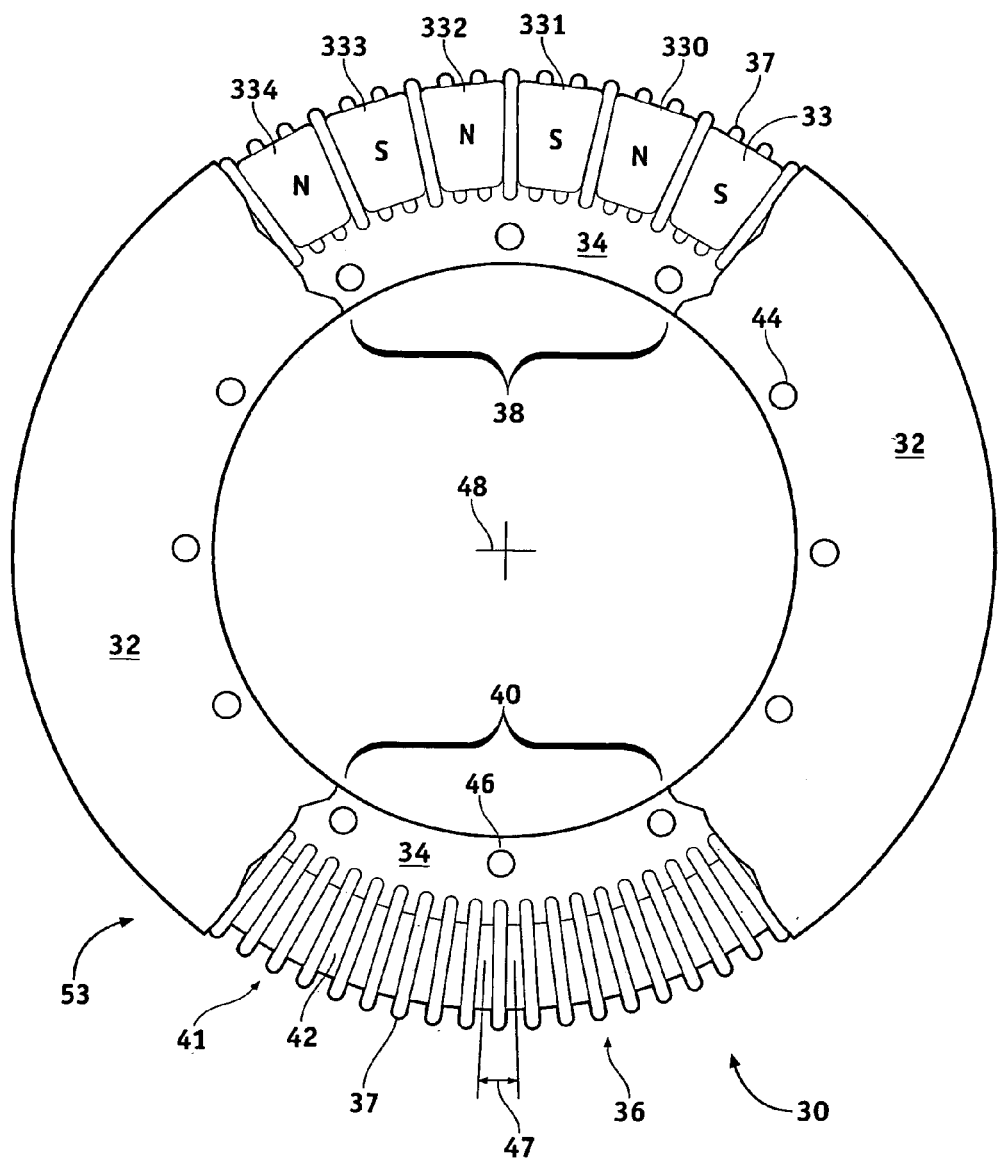
FIG. 1 is a partially cut-away simplified plan view of a traction motor according to the present invention.
Figure 2:
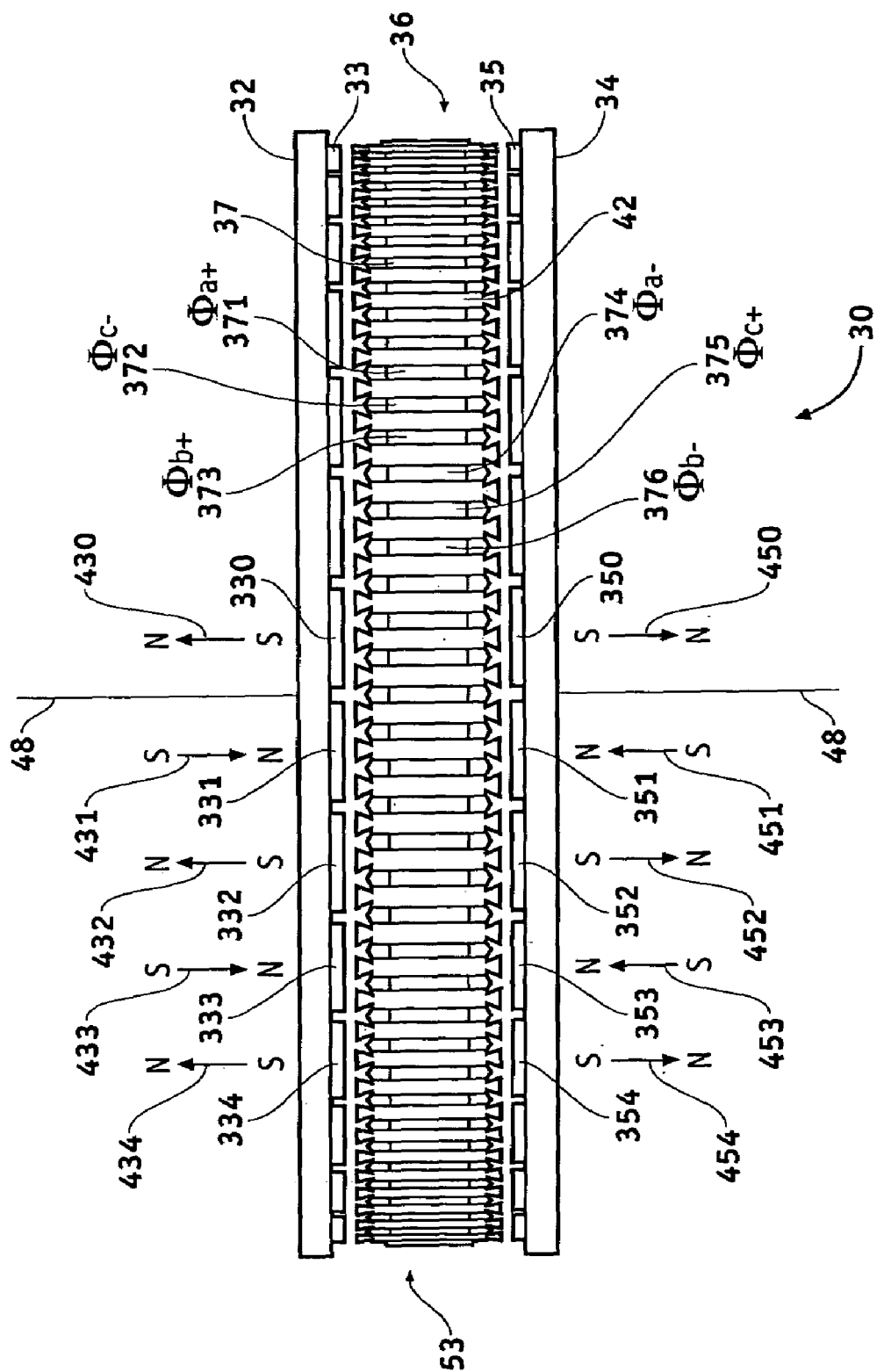
FIG. 2 is a side view of the traction motor of FIG. 1.

Referring now to FIGS. 1–2 together, FIG. 1 is a simplified partial cut-away plan view and FIG. 2 is a side view of rotor and stator portions of traction motor 30 according to the present invention. Motor portion 30 comprises first annular or washer-shaped rotor plate 32 on which are affixed permanent magnets (PMs) 33, second annular or washer-shaped rotor plate 34 on which are affixed PMs 35, and stator 36 with core 41 and current carrying coils (windings) 37 separated by stator pole pieces 42. In FIG. 1, portion 38 of first rotor 32 has been cut away to reveal permanent magnets (PMs) 33 lying above stator 36 and portion 40 has been cut away along with PMs 33 to show underlying stator core 41 supporting windings 37 with stator pole pieces 42 between windings 37. Bolt holes 44, 46 are conveniently provided in rotors 32, 34 respectively by which a rotor support or yoke (not shown) can be provided to couple rotors 32, 34 to a motor output shaft (not shown) rotating around center 48. Pole pieces 42 of stator support core 41 are circumferentially spaced around stator 36, separated by angular amount 47, generally referred to as the stator pole pitch (SPP). In general, coils 37 are similarly spaced around stator 36. Coils 37 are preferably wound from flat ribbon conductors but this is not essential.

Rotors 32, 34 are usually the moving parts coupled to the vehicle wheels and stator 36 is generally fixed to the vehicle frame in some way. This is the preferred arrangement, because it avoids commutating the power leads to the stator, but this is merely convenient and not essential. With the motor of the present invention either the rotors or the stator may be coupled to the vehicle wheels and the other coupled to the vehicle frame. Either arrangement is useful. For convenience of description it is assumed hereafter that the rotors are coupled to the vehicle wheel and the stator to the vehicle frame but this is not intended to be limiting.

Figure 14:
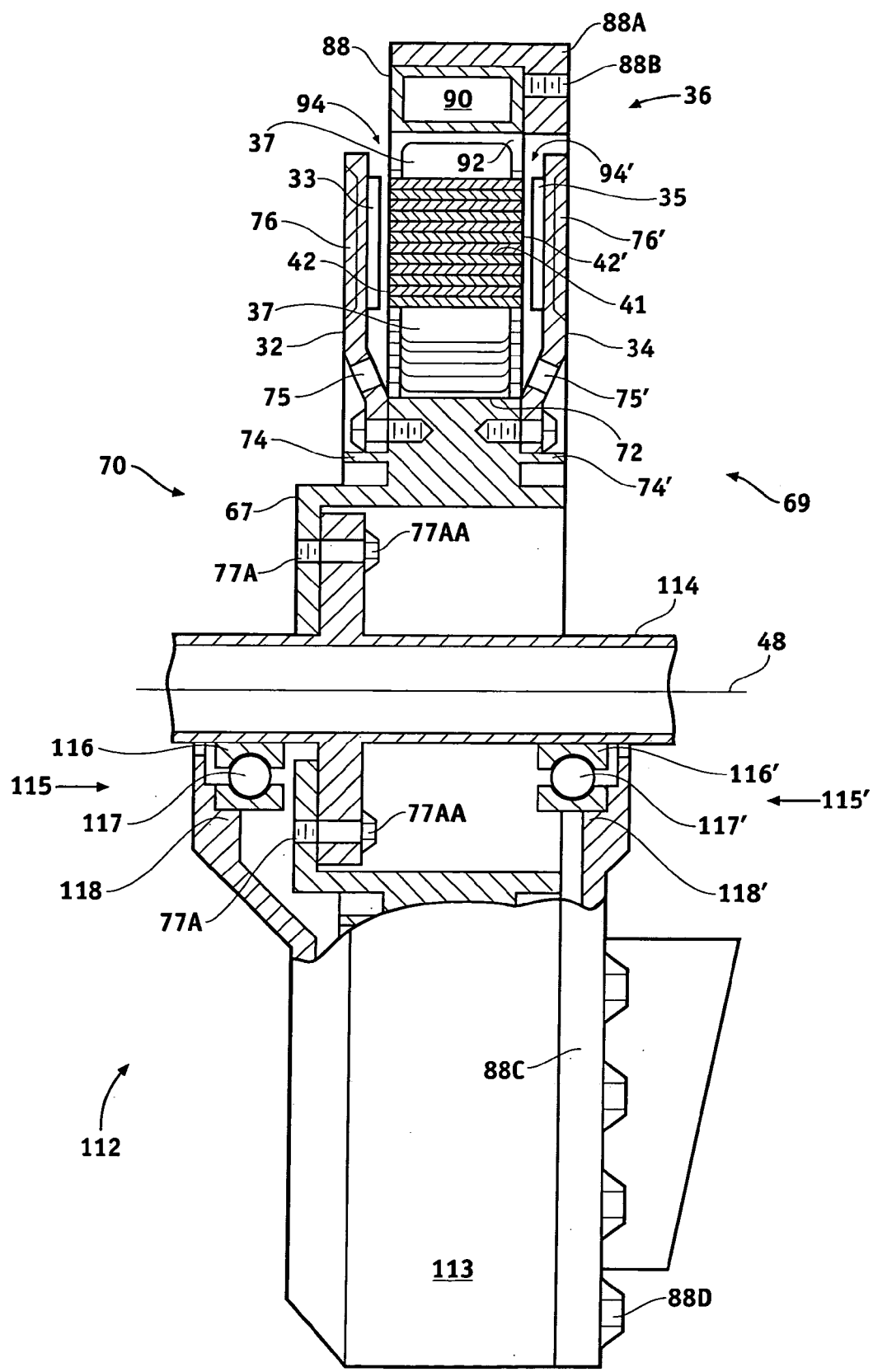
FIG. 14 shows a partially cut-away and cross-sectional view through the traction motor of the present invention with rotors, stator and stator support in place.

For convenience of explanation and clarity of illustration of the important features of motor 30, the yoke or rotor support coupling rotors 32, 34 to the motor output and the structure attaching stator 36 to the vehicle frame are omitted from FIGS. 1–2. (A preferred arrangement is illustrated in FIG. 14.) However, persons of skill in the art will understand that any convenient arrangement may be used for coupling the rotors to the motor output shaft and to the wheels without an intermediate mechanical drive-line (e.g., no differential, reduction gears, etc.) and for coupling the stator to the vehicle fame. Further, persons of skill in the art will understand based on the description herein that rotors 32, 34 are supported by bearings that align rotors 32, 34 with respect to stator 36 while allowing mutual rotation thereof.

First and second rotors 32, 34 with attached permanent magnets (PMs) 33, 35 are coupled together and move together, rotating around axis 48 with respect to stator 36 under the influence of the magnetic fields provided by PMs 33, 35 and coils 37. PMs 33 are magnetized with their magnetic poles substantially perpendicular to the plane of rotors 32, 34 and stator 36, and the direction of magnetization of adjacent PMs alternates. For example (see FIG. 1), if PM 330 has a north (N) in contact with rotor 32 (and therefore a south (S) pole facing stator 36), then PM 331 has a S pole in contact with rotor 32, PM 332 a N and PM 333 a S and so forth. Pairs of PMs are arranged on rotors 32, 34 facing each other across stator 36. Facing PMs on rotors 32, 34 preferably have the opposite magnetization direction. For example, (see FIG. 2) arrows 430, 432, 434 show the direction of magnetization of PMs 330, 332, 334 on rotor 32, which have S poles facing stator 36. Facing PMs 350, 352, 354 on rotor 34 have directions of magnetization shown by arrows 450, 452, 454, also with S poles facing stator 36. Thus, each facing pair of PMs on rotors 32, 34 have opposed directions of magnetization (e.g., see arrows 434, 454 for PMs 334, 354 respectively). This is the preferred arrangement, however, the other arrangement where the magnet facing each other have the same magnetic orientation is also possible and is useful. PMs 33, 35 are attached to rotors 32, 34 by any convenient means, but a fastening means that includes magnetic attraction is preferred. Glue or other adhesive may be used to attach PMs 33, 35 to rotors 32, 34. It is desirable that the glue provide a shear strength equal or greater than about 3 N/mm$^2$. Permanent magnets 33, 35 are conveniently of sintered Nd—Fe—B. Grade VACODYM 655 HR supplied by Vacuumschmelze of Hanau, Germany and grade SC35UH supplied by Italfit Magneti of Udine, Italy are suitable.

Figure 3:
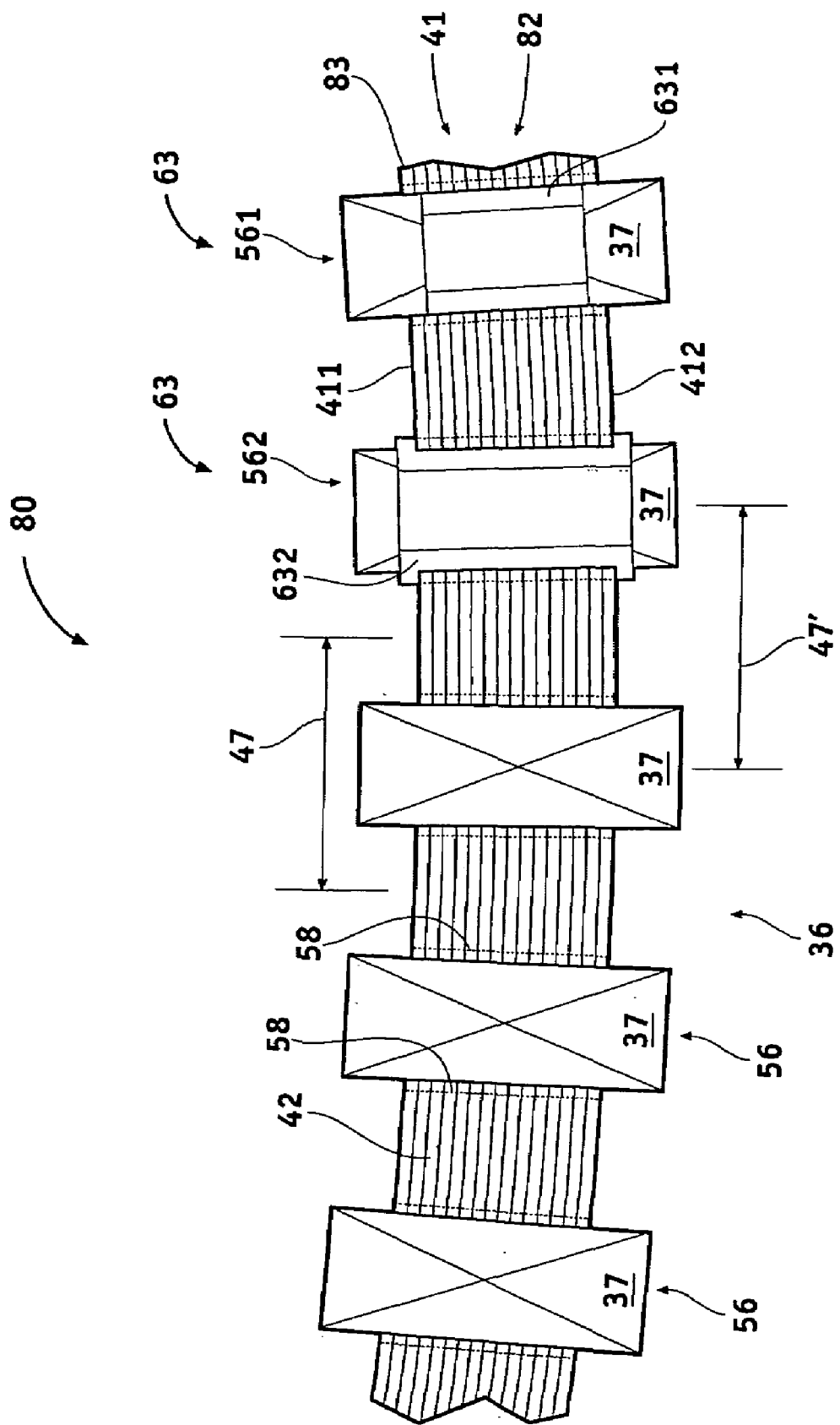
FIG. 3 is a simplified plan view of a portion of the stator of the traction motor of FIGS. 1–2 showing further details.

FIG. 3 is a simplified plan view of portion 80 of core 41 of stator 36 of traction motor 30 of FIG. 1, showing further details and illustrating a preferred manner of construction. Core 41 is preferably radially laminated, that is, formed from many layers of spiral wound iron strip 83. Strip 83 is preferably of the same general type of high magnetization material used in electric machines. Grade M-15 non-oriented electrical steel supplied by A K Steel Corporation, Middletown, Ohio is a non-limiting example of a suitable material. Slots 56 needed to accommodate coils 37 are formed from cut-out regions punched in strip 83 before it is wound into a toriodal shape for core 41. The spacings between the cut-out regions of strip 83 are graduated so that as the strip is wound one layer around the previous layer on a temporary mandrel or form, the cut-out regions in each new layer line up with the cut-out regions of the previous layer to form slots 56 in the finished core. Coils 37 are then conveniently wound in place in slots 56. While this method of assembly of core 41 and coils 37 is preferred it is not essential. For example and not intended to be limiting, an alternative arrangement is to form core 41 in short circumferential segments, one segment for each coil. The core segments can be made, for example, using powder metallurgy techniques. A pre-wound coil is then placed on the segment and successive segments snapped or otherwise attached together to form the toroidal shape of stator 36 complete with core 41 and coils 37. The coils can be electrically coupled together in the desired electrical configuration either before or after assembly. Either arrangement is useful.

Figure 4:
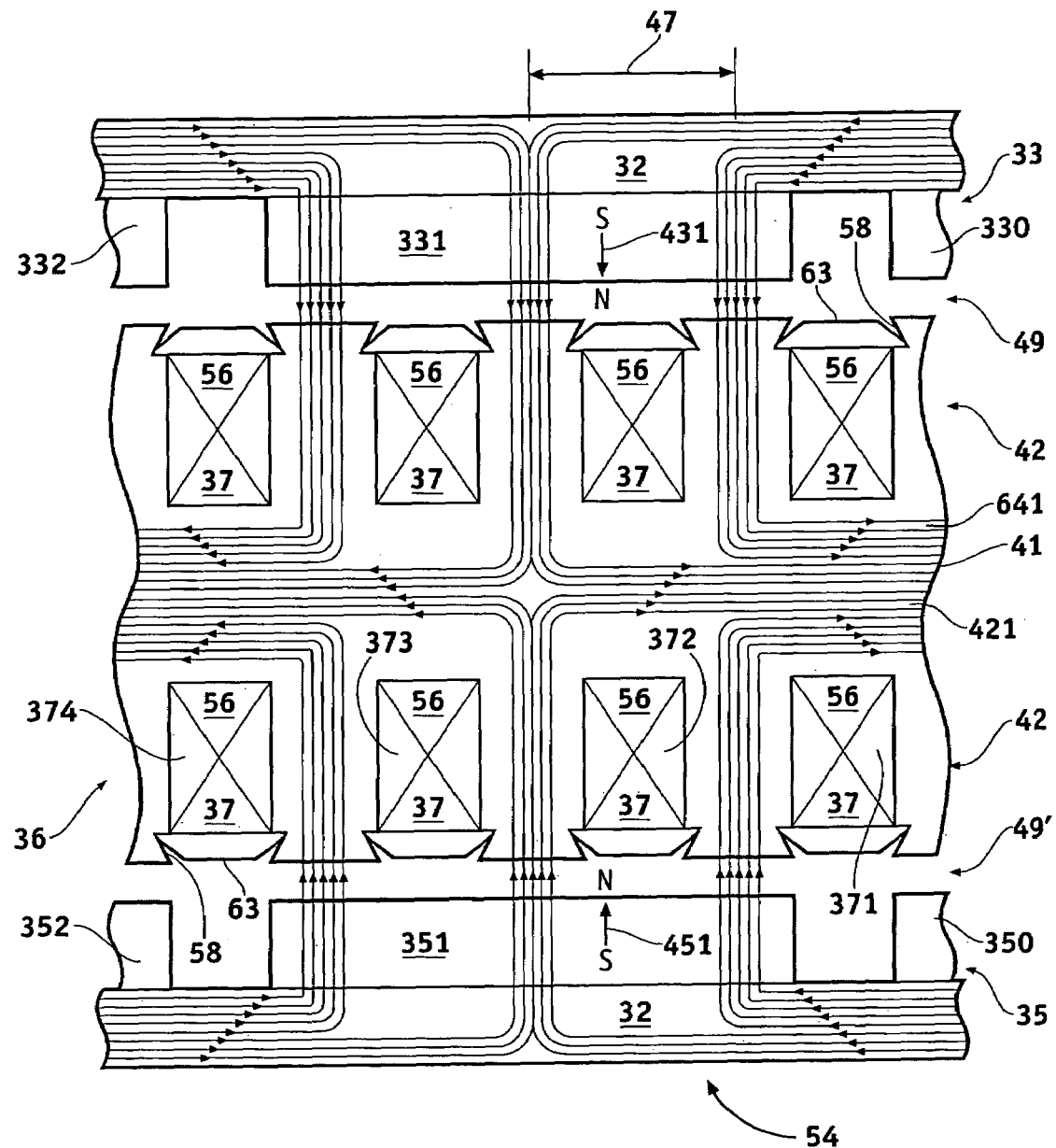
FIG. 4 is a side view of a portion of the stator and rotors of the traction motor of FIGS. 1–2, showing further details.

FIG. 4 is a side view (looking generally in the direction of arrow 53 in FIGS. 1–2) of portion 54 of stator 36 of traction motor 30 of FIGS. 1–2, much enlarged and showing further details illustrating the static flux flow through core 41 and rotors 32, 34 produced by PMs 33, 35. PMs 331, 351 are particularly illustrated. Referring now to FIGS. 2 and 4 together, coils 37 are mounted in slots 56 of stator core 41 between stator pole pieces 42. Air gaps 49, 49' are provided between pole pieces 42 of stator core 41 and PMs 33, 35. In the preferred embodiment, coils 37 are divided into three groups, each driven by one of three phases of AC current. These phases are denoted $\Phi a$, $\Phi b$, $\Phi c$. Currents Ia, Ib, Ic are supplied to phases $\Phi a$, $\Phi b$, $\Phi c$ respectively. As is common in the art, these three phases are "Y" connected with or without a neutral. The coils spaced around the stator are electrically coupled in spaced-apart pairs. Referring now to FIGS. 2, coil 371 is coupled in series with coil 374, coil 372 is coupled in series with 375 and coil 373 is coupled in series with coil 376. Thus, coil 371 receives $\Phi a+$, coil 372 receives $\Phi c-$, coil 373 receives $\Phi b+$, coil 374 receives $\Phi a-$, coil 375 receives $\Phi c+$ and coil 376 receives $\Phi b-$. This coil arrangement is repeated around stator 36. While three phase AC windings are preferred, this is not essential and more or fewer phases may be used depending upon the needs of the vehicle design.

A problem associated with axial flux machines of the type described here is the cogging arising from the cored stator design. Cogging torque results from the interaction of the magnet edges with the stator slots. Cogging appears as pulsations in the torque output of the motor. Unless compensated, these pulsations can be transferred to the vehicle driveline, thereby producing unwanted vibrations. Cogging also causes wasteful harmonics to be generated. When cogging is severe these harmonics are visible in the motor's voltage and current waveforms. It has been discovered that cogging can be virtually eliminated by dividing the PMs into two or more groups that are spaced apart on the rotors.

Figure 5A:
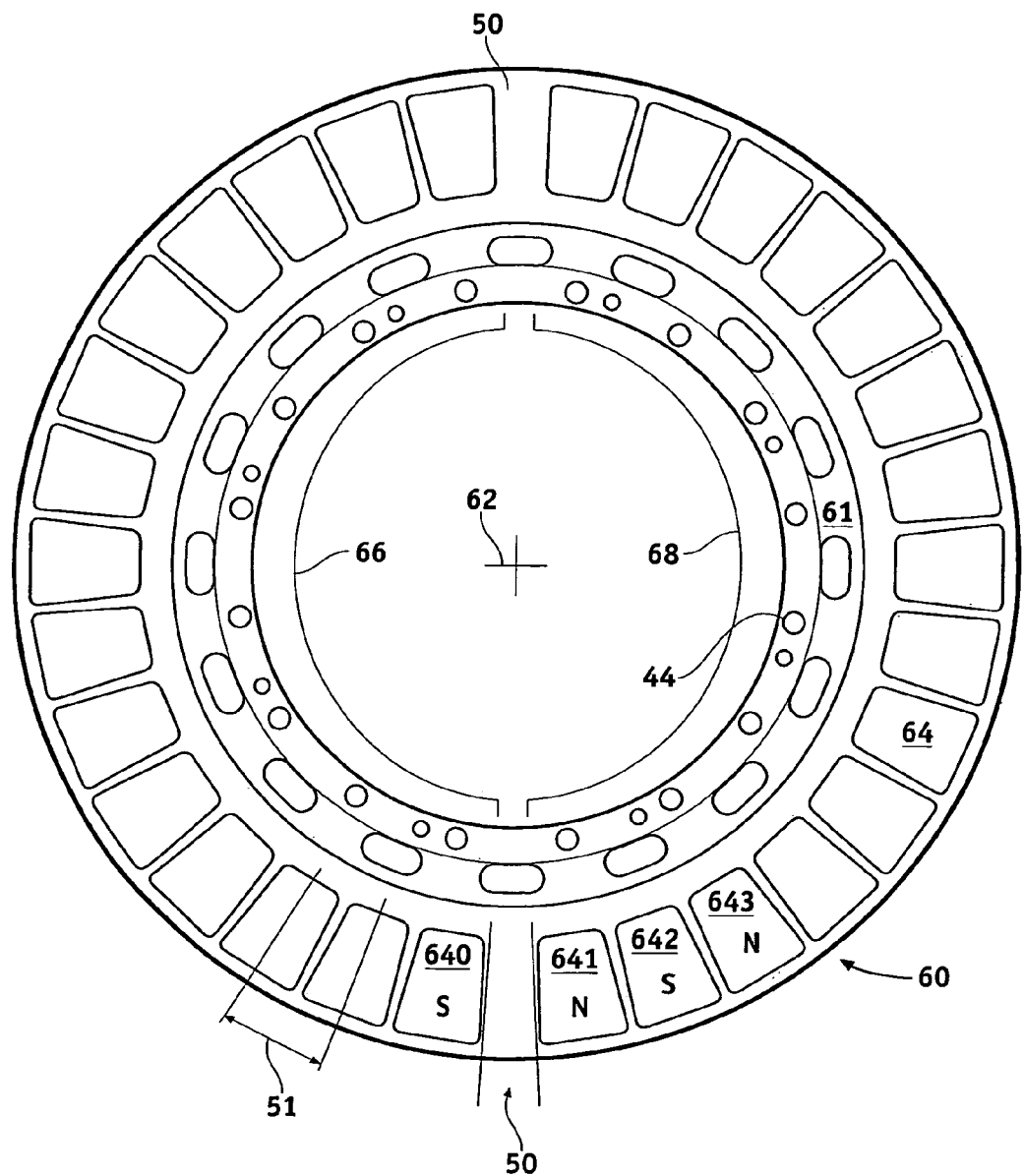
FIGS. 5A and 5B are plan views of the interior face of rotors of the traction motor of FIGS. 1–2 showing further details and according to further embodiments.
Figure 5B:
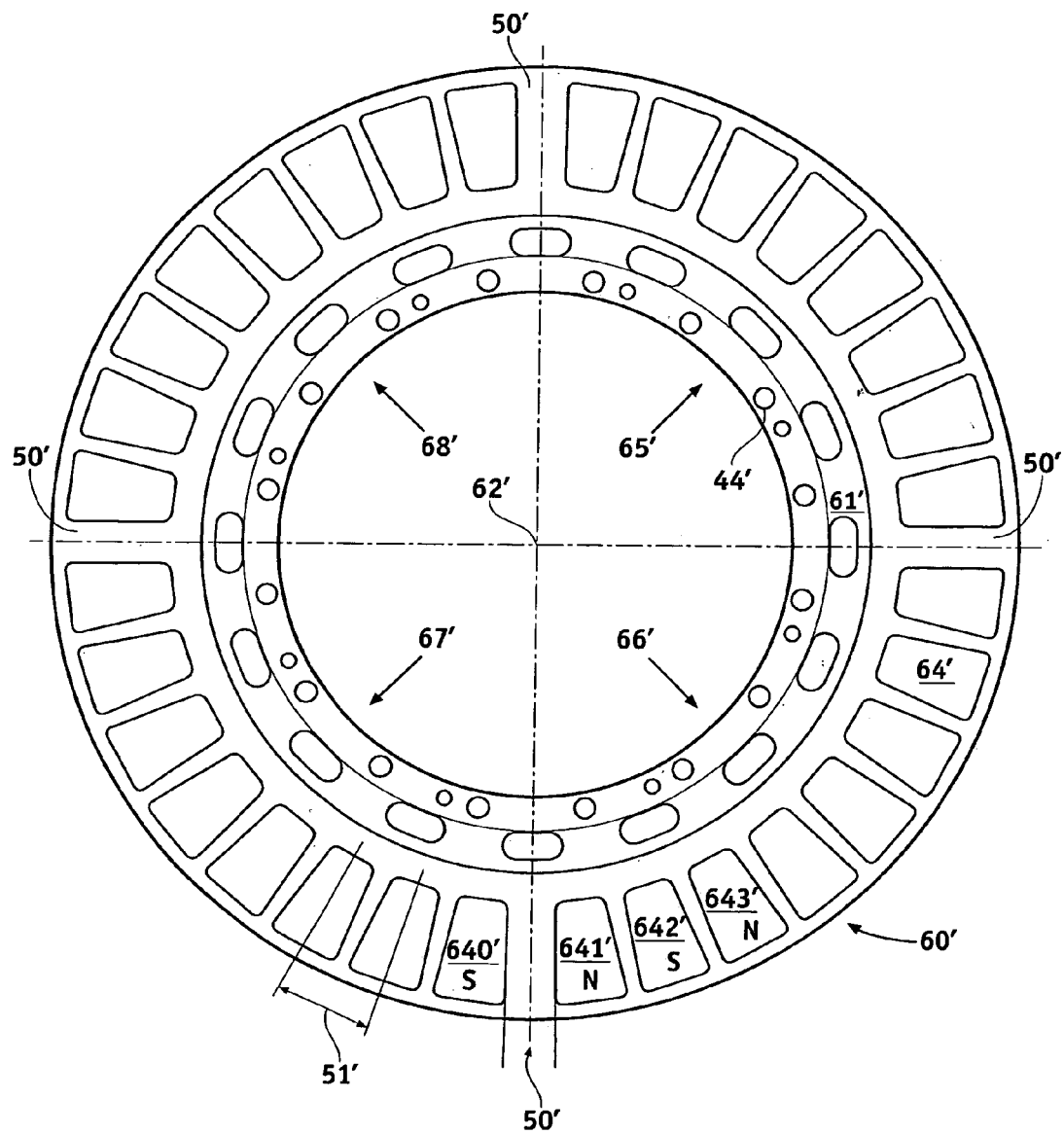

FIGS. 5A and 5B are plan views of interior surface 61, 61' of rotor 60, 60' according to further embodiments of the present invention and suitable for use in place of rotors 32, 34 of traction motor 30 of FIGS. 1–2, so as to reduce or eliminate cogging. Interior surface 61, 61' of rotor 60, 60' faces toward stator 36 and rotor 60, 60' rotates around center 62, 62' analogous to center 48, in much the same manner as rotors 32, 34 already described. Surface 61, 61' of rotor 60, 60' has mounted thereon, PM's 64, 64' generally similar to PMs 33, 35 of rotors 32, 34, but with different circumferential spacing, that is, different PM pitch 51, 51'. As illustrated by PMs 640, 641, 642, 643 of rotor 60 and PMs 640', 641', 642', 643' of rotor 60', north-south magnetic orientation alternates in the same manner as for PMs 33, 35 of rotors 32, 34. For example, if PM 640 has a S pole facing axially away from surface 61 (i.e., toward stator 36), then PM 641 will have a N pole, PM 642 a S pole, PM 643 a N Pole and so forth, facing stator 36, and similarly for their primed equivalents on rotor 60'. In FIG. 5A, PMs 64 are conveniently divided into two groups 66, 68, and in FIG. 5B PMs 64' are conveniently divided into four groups 65', 66', 67', 68', but different numbers of groups may also be used and the examples in FIGS. 5A–B are not intended to be limiting. Groups 66, 68 are separated by gaps 50 and groups 65', 66', 67', 68' are separated by gaps 50'.

Where stator 36 has M pole pieces and M coils and is driven by a 3-phase supply, then M/3 coils are assigned to each phase. Each PM bridges approximately across three stator pole pieces 42 and three coils 37 (see FIGS. 2, 4). Thus, the preferred arrangement uses M/3 PMs. The stator pole pitch (SPP) is 360/M. The SPP is the angular separation between the centerlines of successive stator pole pieces 42 (i.e., angle 47 in FIG. 1). Where the PMs are uniformly distributed around the periphery of rotors 32, 34, then the PM pitch (PMP) is 3×(360/M). In the embodiment of FIG. 5A, there are M=90 coils and pole pieces on stator 36 and M/3=30 PMs on rotors 32, 34, 60. Thus SPP=360/90=4 degrees and for evenly distributed PMs the PMP=360/30=12 degrees.

It has been found that cogging can be substantially reduced without adverse side affects by short pitching the PMs, for example in groups 66, 68 by an amount equal to about one-half the SPP for each group. In the preferred embodiment, gaps 50 between groups 66, 68 are each approximately 2×SPP/2=2×360/(2M)=360/90=about 4 degrees for M=90. This is accomplished by reducing the spacing between PMs and/or slightly narrowing the circumferential width of each PM so that the requisite number (360/12)/n fit in each group where n is the number of groups. In FIG. 5A for a 90-pole machine with three poles per PM and two groups of PMs, there are 15 in each group. Thus, in the embodiment of FIG. 5A for an M=90 pole, 3 phase motor using short-pitched rotor 60, PMPs 51 desirably equals about (180−4)/15=11.73 degrees mechanical or 176 degrees electrical, more or less. Electrical degrees equals mechanical degrees multiplied by the number of rotor pole pairs (15 for FIG. 5A). Persons of skill in the art will understand that gaps 50 in PM group spacing of short pitched rotor 60 can vary from these ideal numbers. For example and not intended to be limiting, gaps 50 are usefully in the range of about 1 to 7 degrees, better from about 2 to 6 degrees and preferably about 4 degrees. $PMP_s$ 51 is adjusted correspondingly in accordance with the size of gaps 50 and the number of PMs and gaps being used.

FIG. 5B illustrates a further embodiment employing four groups of PMs 65', 66', 67', 68' spaced apart by gaps 50'. Each group has 8 PMs so that the total number of PMs is 32. As noted in FIG. 4, there are desirably 3 slots and coils per PM so there are a total of 3×32=96 slots and coils with the arrangement of FIG. 5B. So in FIG. 5B, M=96. Shortened permanent magnet pitch $PMP_S$ 51' is conveniently about (90−3.75)/8=10.78125 mechanical degrees or 172.5 electrical degrees. Persons of skill in the art will appreciate based on the description herein that while two and four groups are illustrated in FIGS. 5A–B, this is not intended to be limiting and more groups can also be used. In general, it is desirable that an even number of groups be used.

Expressed more generally, the shortened permanent magnet pitch $PMP_S$ in mechanical degrees can be determined from the equation $PMP_S=(\gamma n 360/M)(1/n-1/M)=360\gamma[(M-n)/M^2]$, where M is the number of poles on the stator, n is the number of groups into which the permanent magnets are divided (e.g., n=2, 3, 4 . . . ), and y is the number of phases (e.g., 2, 3, 4 . . . ). Thus for the arrangements of FIGS. 5A–B, identified respectively as $PMP_S(60)$ and $PMP_S(60')$, evaluating the foregoing equation yields the shortened permanent magnet pitch values $PMP_S(60)=(3*2*360/90)(1/2-1/90)=11.73$ degrees, and $PMP_S(60')=(3*4*360/96)(1/4-1/96)=10.78$ degrees, as noted above.

Figure 5C:
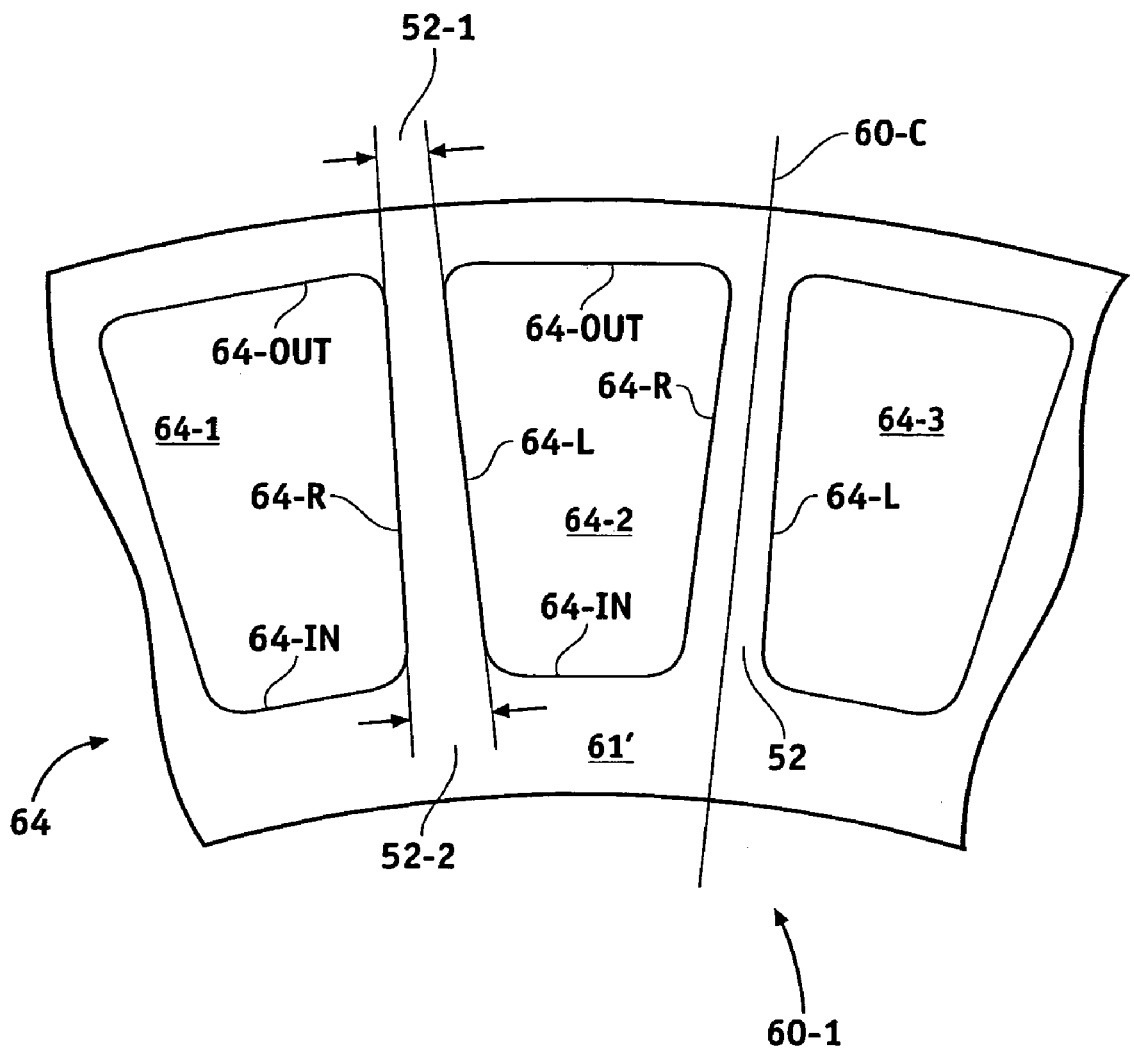
FIG. 5C is a plan view of an enlarged segment of the rotor of FIG. 5A or 5B showing still further details.

FIG. 5C is a plan view of enlarged segment 60-1 of rotors 60, 60' of FIG. 5A or 5B, showing further details and according to a further embodiment. Segment 60-1 illustrates three adjacent PMs 64, that is, PMs 64-1, 64-2, 64-3. It will be noted that spacing 52 between adjacent PMs 64 of FIG. 5C is not uniform, but varies as a function of radial distance from radially inner edges 64-IN of PMs 64 to radially outer edges 64-OUT of PMs 64. In the example of FIG. 5C, magnet-to-magnet spacing or gap 52-1 at radially outer edges 64-OUT is smaller than gap 52-2 at radially inner edges 64-IN. Stated another way, facing edges 64R, 64L of adjacent PMs (e.g., PMS 64-2, 64-3) are not parallel but slant apart or toward each other, as preferred by the designer. In the example of FIG. 5C, facing edges 64R, 64L slant apart as one progresses from radially outward PM edge 64-OUT toward radially inner PM edge 64-IN, but this is not intended to be limiting and they can also slant toward each other. Equivalently, the arrangement of facing edges 64R, 64L are such that they are preferably not parallel to radial line 60C that passes through center 62, 62' of rotor 60, 60'. It is preferred that facing edges 64R, 64L not be parallel to each other or parallel to radial line 60C. This reduces the cogging without a significant loss of torque and is generally superior in performance to prior art arrangements where facing edges 64R, 64L are parallel with respect to radial line 60C.

Figure 6:
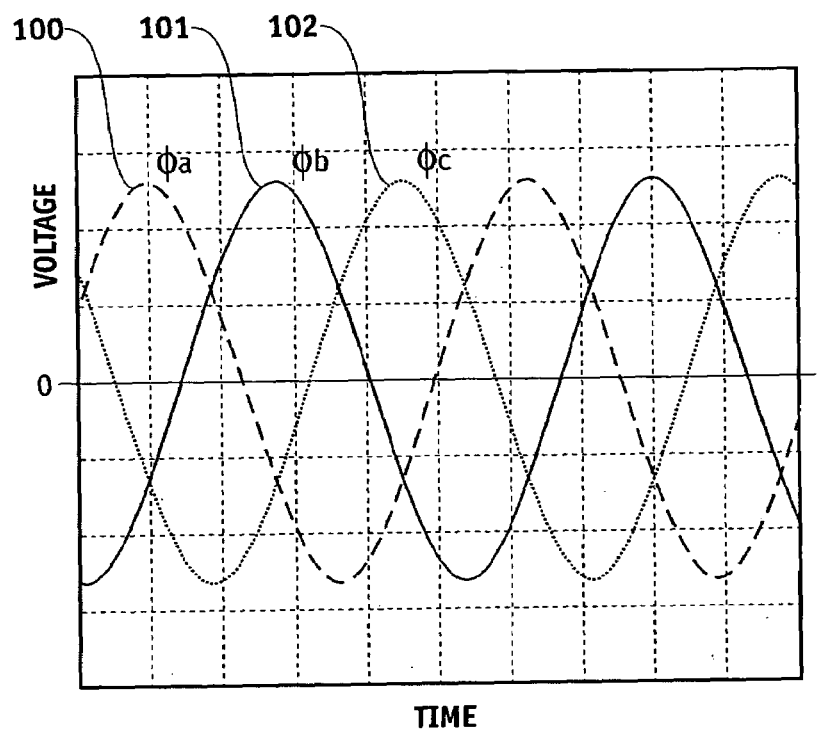
FIG. 6 is a plot of observed back-emf voltage on the windings of the traction motor of the present invention versus time, for a preferred embodiment of the present invention.

Short-pitching the PMs and varying the spacing of adjacent PM facing edges, as illustrated in FIGS. 5A–C, produces a significant improvement in cogging and harmonic distortion as can be seen in FIG. 6 which shows back-emf voltage waveforms 100, 101, 102 of the three phases of traction motor 30 incorporating short-pitched rotors of the type shown in FIG. 5A. It will be observed that the waveforms are very sinusoidal indicating that there is little harmonic generation and therefore little cogging. The reduction in cogging is a particular feature of the present invention. Short pitching the PMs averages the slotting effect of the interaction of the rotor magnets and the stator pole pieces, thereby reducing the cogging. The invented PM short pitching arrangement is particularly effective. The use of non-parallel facing magnet edges also contributes to the reduction in cogging.

FIG. 4 illustrates another aspect of the present invention. One of the problems associated with axial flux motors is the low phase inductance, especially at higher speeds. This adversely affects the range of speed over which the motor will operate at substantially constant power. Moreover, this low inductance can increase the d-axis current injection needed at higher speed for field weakening, thereby resulting in lower efficiency at higher speeds. Additionally, the slotting effect due to the slots between the PMs mounted on the rotors increases the no-load spin loss of the machine due to eddy current induced by the magnet flux. These problems are substantially eliminated by the inclusion of magnetic fringing flux shunts or wedges 63 in stator core 41 above coils 37 (see FIGS. 3–4). The material of magnetic wedges 63 conveniently has a permeability that is much higher than that of air, but much lower than the permeability of steel lamination strip 83 used to form core 41 (see FIG. 3), and preferably does not saturate. This choice of this material for magnetic wedges 63 minimizes the short-circuit leakage flux into the magnetic wedges, while still providing improvement in the machine inductance. This provides a magnetic path for leakage flux, thereby improving inductance at all torque levels. The improvement in machine inductance both improves the high speed constant power range and the high speed efficiency. Another benefit of magnetic wedges 63 is to increase the machine back-emf, thus improving torque without increasing the magnet content, and thus without increasing cost. This improvement in back-emf is achieved by the improvement of permeability of the magnetic circuit due to the addition of magnetic wedges 63 to the stator flux paths. The introduction of magnetic wedges 63 also reduces the stator slotting effect, which is a major source of no-load spin loss. As a consequence, the no-load spin loss is also reduced by using wedges 63. Soft magnetic composite type steel such as Somaloy 500_+0.6% LB1 steel sold by Hoganas AB of Sweden, is a non-limiting example of the class of materials useful for wedges 63, but other materials meeting the general specification recited above may also be used. While the trapezoidal-shape of wedges 63 illustrated in FIG. 4 allows them to be conveniently inserted into notches 58 in slots 56 and retained in place, this is not essential and any shape of wedges or fringing flux shunts 63 that allows them to be placed at least partly across the openings of coil slots 56 is also useful. Non-limiting examples of other shapes for magnetic wedges 63 are trapezoidal, rectangular, elongated hexagon , half-cylindrical shapes, and so forth. However, it is preferable that they not protrude substantially into space 49, 49 ' between pole pieces 42 and PMs 33, 35 (e.g., see FIG. 4).

Referring again to FIG. 3. Two examples of magnetic wedges 63 are shown installed in notches 58 of coil slots 56. Magnetic wedge 631 in coil slot 561 extends part way across coil slot 561 between radially inward surface 411 and radially outward surface 412 of annular core 41. Magnetic wedge 632 located in coil slot 562 extends beyond surfaces 411, 412. The arrangement of magnetic wedge 632 is preferred, but is not essential and not intended to be limiting. Smaller or larger coverage of slots 56 can also be used.

Figure 7:
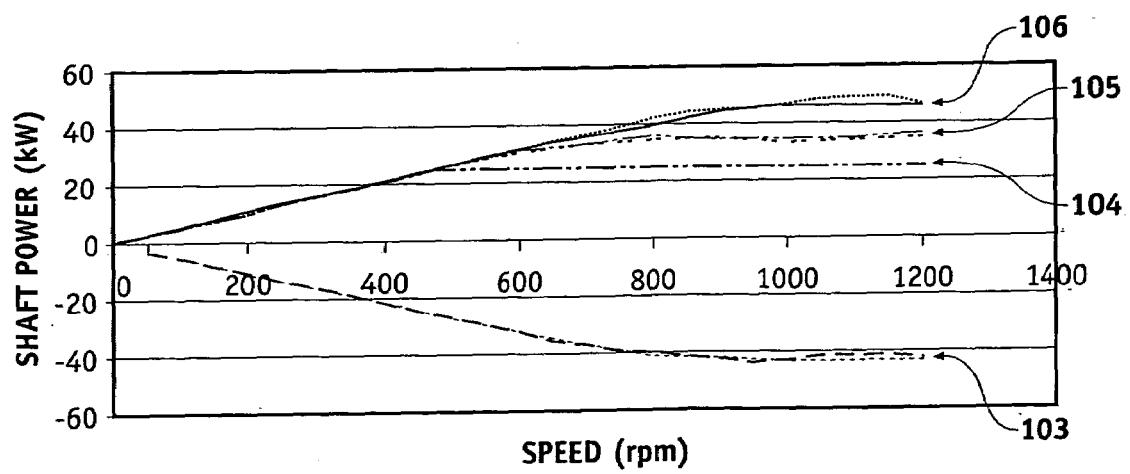
FIG. 7 is a plot of shaft power versus shaft speed for the motor of the present invention under several operating conditions.

FIG. 7 shows shaft power versus speed curves 103–106 of motor 30 incorporating magnetic wedges 63 of FIGS. 3–4. Curve 103 shows calculated and measured regeneration operation at 250 volts, curve 104 shows the desired minimum motoring shaft power desired as a function of speed, curve 105 shows calculated and measured motoring operation at 250 volts, and curve 106 shows the calculated and measured motoring operation at 350 volts. It will be noted that the measured and calculated machine performance curves are substantially coincident indicating that the magnetic model of the machine is reliable, and that the target motoring specification is equaled or exceeded at all speeds. It can be further seen that at higher speeds, e.g., 600–1200 RPM the power output. becomes approximately constant for the machine nominal voltage of 250V. Maintaining a long constant power range is highly desirable for vehicle propulsion application. It will be noted further that from zero to approximately 600 rpm (also at 250 volts; curve 105) the power output increases linearly with speed indicating that the motor is providing substantially constant torque over this range. This is also desirable.

Figure 8:
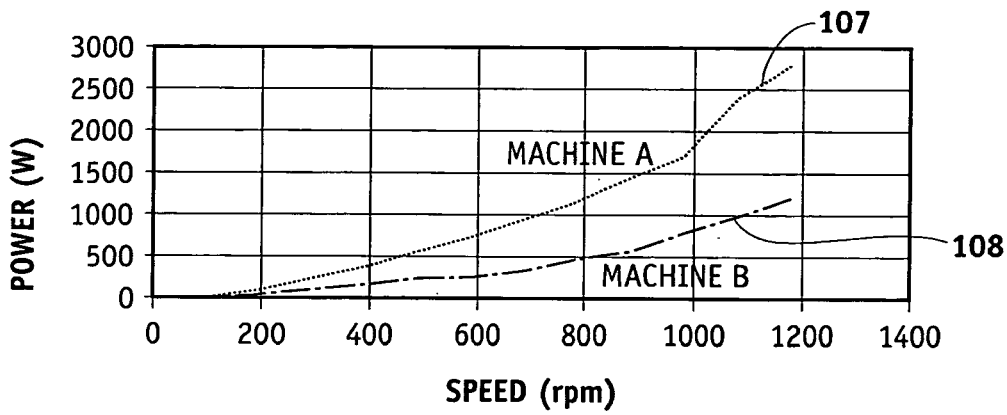
FIG. 8 is a plot of no-load power consumption versus speed for two motors, one including a preferred embodiment of the present invention and the other without.
Figure 9A:
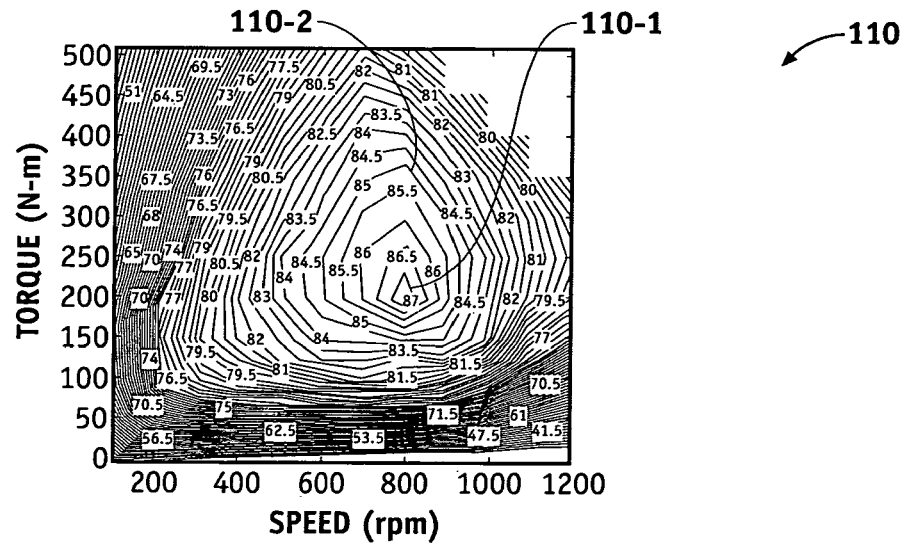
FIGS. 9A and 9B are constant efficiency torque versus speed contours for two motors, one with a preferred embodiment of the present invention in FIG. 9B and the other without in FIG. 9A.
Figure 9B:
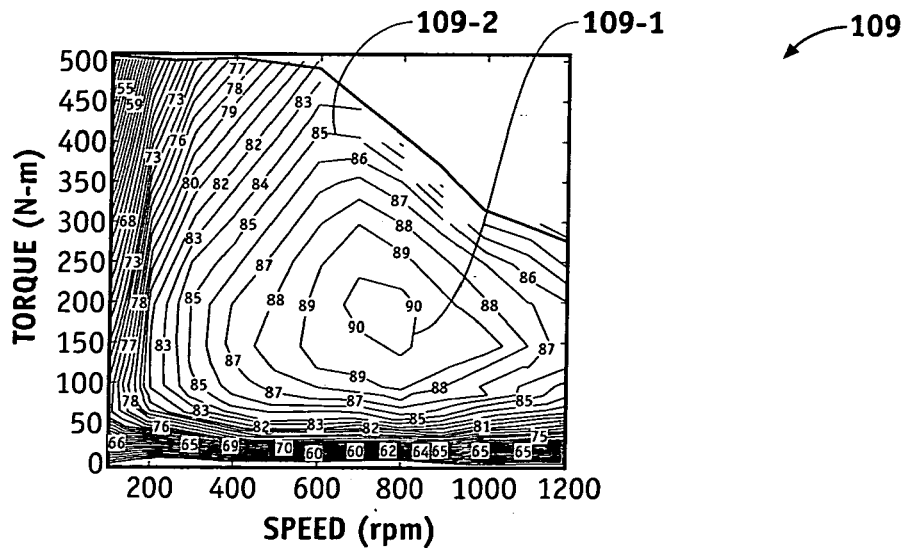

FIG. 8 shows curves 107–108 of no-load power consumption versus speed for two machines; Machine A (curve 107) without wedges 63 and Machine B (curve 108) with wedges 63, both operating under otherwise substantially identical conditions. Both machines have comparable back-emf. It will be noted that Machine B (curve 108) with wedges 63 uses much less power and therefore has significantly lower no-load spin loss. In addition to reducing the no-load spin loss, the addition of magnetic wedges 63 to stator 36 further improves the overall efficiency of the machine. This is shown by constant efficiency torque versus speed contours 109, 110 presented in FIGS. 9A–9B. Each of contours 109, 110 is the locus of allowable torque and speed at constant efficiency, the highest efficiencies in each case corresponding to the inner-most contours. FIG. 9B shows data for Machine B with magnetic wedges 63 and FIG. 9A shows data for an otherwise substantially identical Machine A without wedges 63. Both motors were operating at 250 volts. In FIG. 9B, inner-most contour 109-1 corresponds to an efficiency of ninety percent while in FIG. 9-A innermost contour 110-1 corresponds to an efficiency of only eighty-seven percent. Thus, Machine B with wedges 63 has generally higher efficiency. In addition, for almost any given efficiency level, the torque-speed contours of Machine B (with wedges 63) in FIG. 9B have larger operating area. This means that, for almost any given efficiency level, Machine B with wedges 63 can operate over a greater range of torque and speed than Machine A without wedges 63. This can be seen for example by comparing curves 109-2 and 110-2, which both correspond to eighty-five percent efficiency. The area of contour 109-2 is much larger than that of 110-2. The inclusion of magnetic wedges 63 is an important aspect of the present invention.

Figure 10:
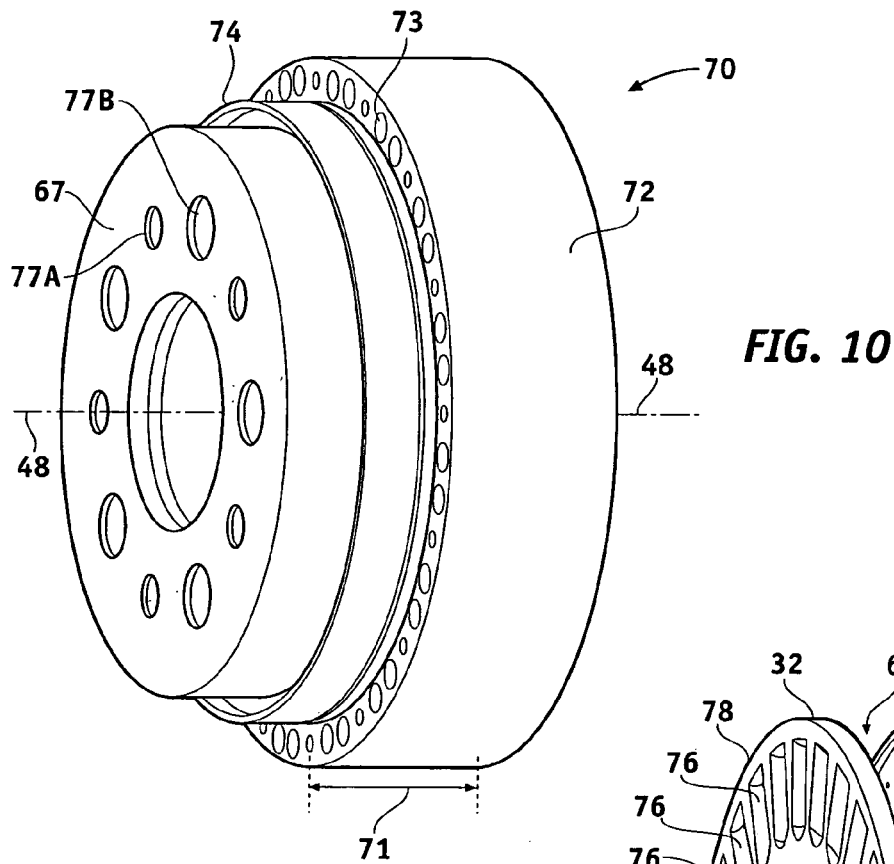
FIG. 10 is a perspective view of a rotor support according to a preferred embodiment of the present invention.
Figure 11:
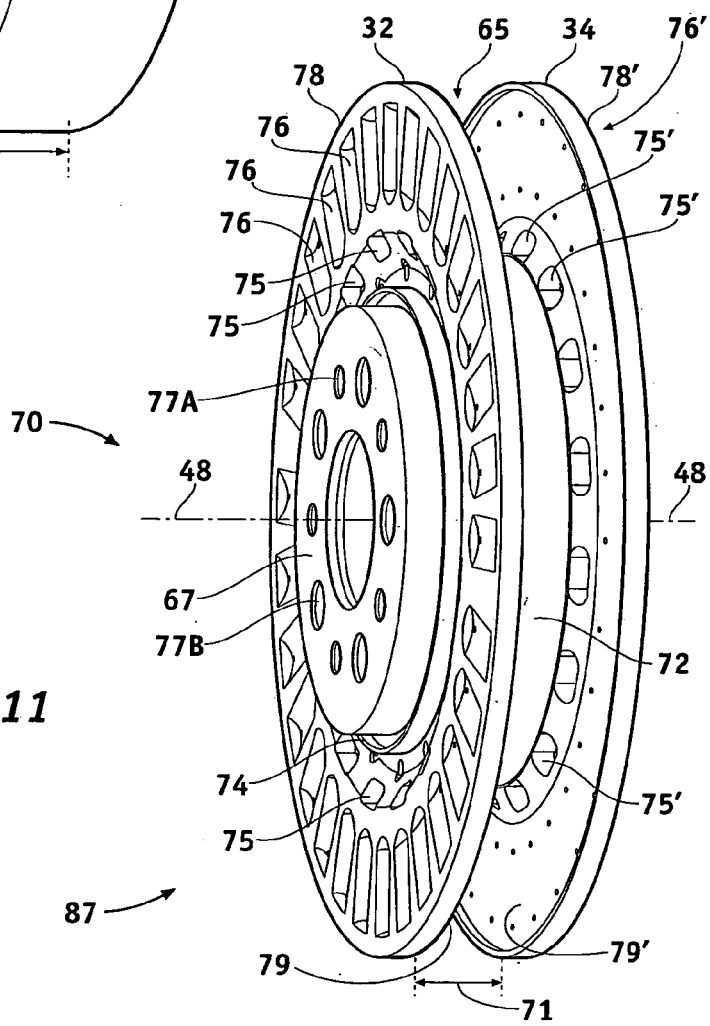
FIG. 11 is a perspective view of the rotor support of FIG. 10 with rotors mounted thereon and showing further details.

FIG. 10 is a perspective view of rotor support or yoke 70 according to a preferred embodiment of the present invention and FIG. 11 is a perspective view of assembly 87 comprising rotor support or yoke 70 with rotors 32, 34 mounted thereon. In the discussion that follows, it will be understood that rotors 32, 34 can also have the configuration of rotor 60, 60' of FIGS. 5A–C, and such are intended to be included in references to rotors 32, 34 in connection with FIGS. 10–14. Rotor support 70 comprises axial spacing region 72 whose axial width 71 conveniently (but not essentially) determines the axial spacing of rotors 32, 34. Holes 73 are conveniently included in axial spacer 72 to reduce its weight. Support 70 also desirably but not essentially has radial spacer 74 that centers rotors 32, 34 with respect to axis of rotation 48. Radial spacer 74 may be made a part of axial spacer 72. Either arrangement works. Axial spacer 72 and radial spacer 74 are tied together and supported in the proper position with respect to axis of rotation 48 by radial gusset plates or web or spoke(s) 67 whose purpose is to couple rotors 32, 34 to whatever is being driven by traction motor 30 and hold the moving parts (e.g., rotors 32, 34) in the proper alignment with respect to axis of rotation 48 and stator 36 (not shown here). Web 67 conveniently but not essentially has holes 77A–B provided therein to facilitate mounting and reduce weight. Web 67 may also be made in the form of one or more spokes extending from a central ring, rather than being a solid plate with holes, as shown for convenience of explanation in FIGS. 10–11. Either arrangement works. Web 67 attaches to a wheel, shaft or other part (not shown) intended to be driven by traction motor 30, in any convenient way according to the needs of the vehicle designer. Rotors 32, 34 conveniently but not essentially have ventilation openings 75, 75' therein (see FIG. 11) that provide for air circulation into interior space 65 between rotors 32, 34 where stator 36 will be located (e.g., see FIGS. 2, 14). This helps to maintain uniform internal temperatures. Openings 75, 75' also reduce the weight of rotors 32, 34, which is desirable. For convenience of illustration PMs 33, 35 are not shown in FIG. 11.

Figure 12A:
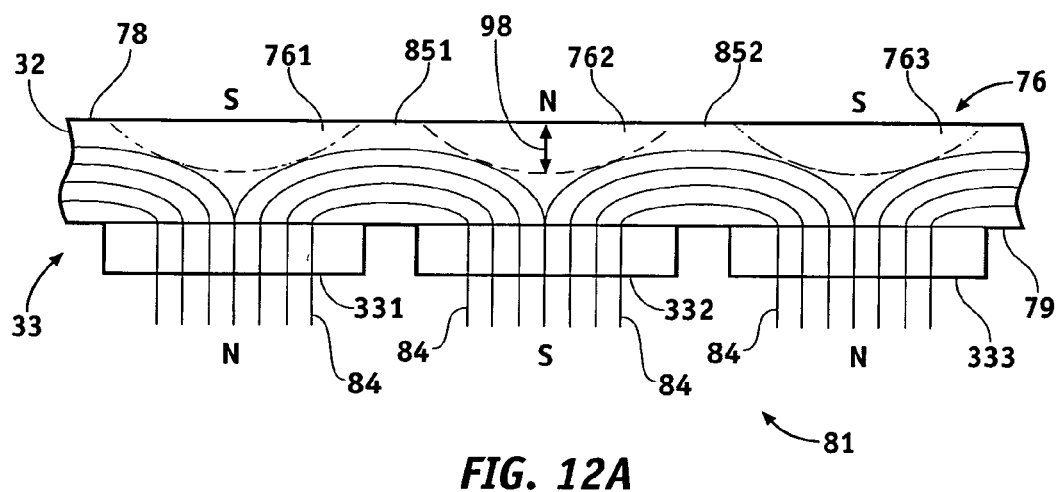
FIG. 12A is a simplified edge view and FIG. 12B is a simplified plan view of a portion of a rotor of FIG. 11 showing still further details.
Figure 12B:
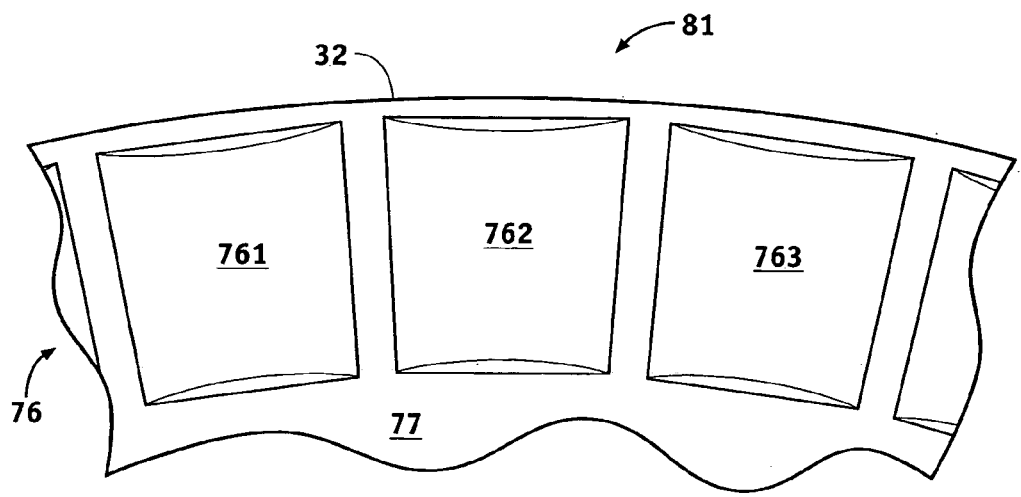

FIG. 12A is a simplified edge view and FIG. 12B is a simplified plan view of portion 81 of rotors 32, 34 of FIG. 11 showing still further details. Referring now to FIGS. 11 and 12A–12B, rotors 32, 34 are provided with scooped-out or hollowed-out regions 76, 76' on their exterior faces, that is, on rotor surfaces 78, 78' facing away from region 65 between rotors 32, 34 where stator 36 will be located. (Scooped out or hollowed-out regions 76' on face 78' of rotor 34 are not visible in FIGS. 11, 12A–12B but are indicated in phantom in FIG. 14.) Referring now to FIGS. 12A–12B, scooped out or hollowed-out regions 76, 76' of depth 98 are located on exterior surfaces 78, 78' substantially directly behind permanent magnets 33, 35 located on interior surfaces 79, 79' of rotors 32, 34 respectively, and are of substantially similar area or lateral extent as magnets 33, 35. Depth 98 of scooped out or hollowed-out regions 76, 76' is chosen so as to not significantly interfere with magnetic flux 84 coupling between adjacent permanent magnets 331, 332, 333, etc., on rotor 32 and analogously on rotor 34. For example, scooped out or hollowed-out region 761 lies substantially directly behind permanent magnet (PM) 331, region 762 behind PM 332, region 763 behind PM 333 and so forth circumferentially around rotor 32. Magnetic flux 84 passes from PM 331 to PM 332 and from PM 332 to PM 333, etc., through rotor 32, traversing non-scooped out or non-hollowed-out regions 851, 852, etc., between PMs 33, essentially without significant interference from scooped out or hollowed-out regions 761, 762, 763, etc. Rotor 34 is arranged in a similar way. This substantially reduces the weight of rotors 32, 34 without a significant sacrifice in PM flux coupling and motor performance. Total flux in the rotor core behind the magnet is a minimum in the center of the magnet and gradually increases towards the two magnet edges. Therefore, the scooped out or hollowed-out region in the rotor back iron does not significantly affect total magnet flux, nor significantly affect the attainable torque. However, a significant reduction in rotor mass is achieved. This is a particular feature of the present invention.

Rotors 32, 34 are magnetic so as to provide a low reluctance magnetic path between adjacent PMs 33 on rotor 32 and PMs 35 on rotor 34. Armco iron supplied by A K Steel of Middletown, Ohio is a non-limiting example of a suitable material for rotors 32, 34. In general rotors 32, 34 need not be laminated, but this is not precluded. Rotor support structure or yoke 70 is preferably of a lighter and, usually, a non-magnetic material. Aluminum, magnesium, titanium, various non-magnetic metal alloys, plastics, metal-plastic composites, plastics loaded with non-magnetic materials (e.g., glass, carbon, ceramic fibers or fragments, etc.) and combinations thereof are non-limiting examples of materials suitable for support structure or yoke 70. What is important is that support structure or yoke 70 be sufficiently stiff so as to hold rotors 32, 34 in axial and radial alignment with respect to stator 36 (e.g., see FIG. 14), withstand the forces generated by operation of motor 30, couple the torque generated by motor 30 to the vehicle wheel (not shown), be generally corrosion resistant and have the minimum possible weight consistent with the structural requirements. By using lighter weight structural materials for rotor support 70 and limiting the heavier magnetic materials of rotors 32, 34 to just the regions that require low magnetic reluctance, the overall weight and moment of inertia of motor 30 are minimized and the overall performance of traction motor 30 is enhanced. This is a particular feature of the present invention.

Figure 13A:
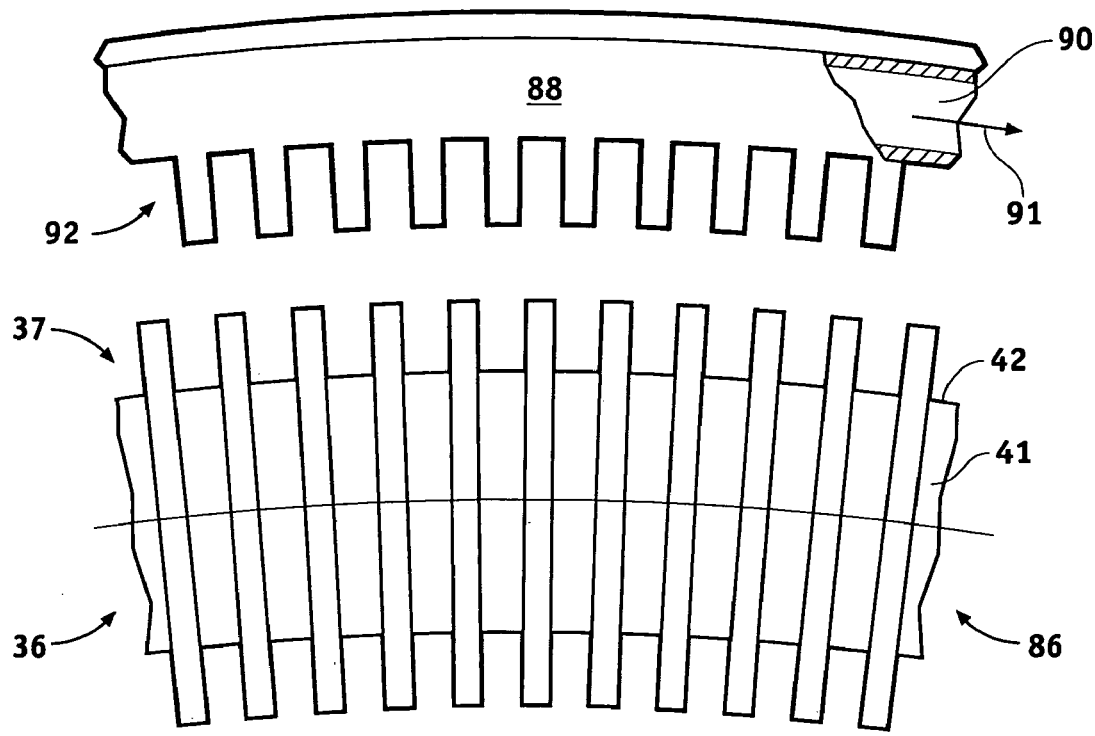
Figure 13B:
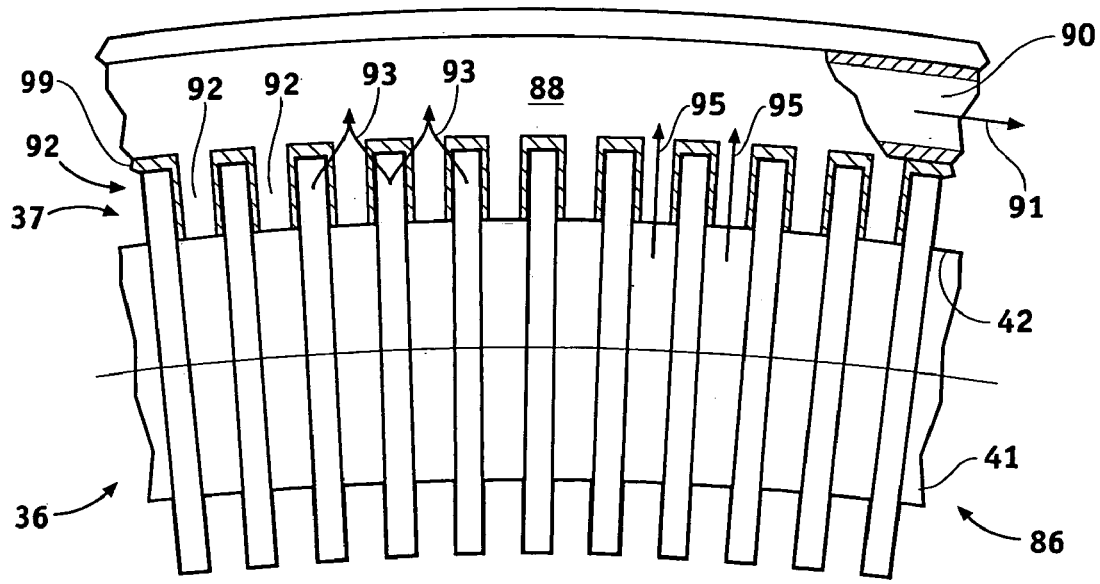

FIGS. 13A–13B are simplified plan views of segment 86 of stator 36 and stator support 88 of traction motor 30 of the present invention, wherein FIG. 13A shows stator 36 and stator support 88 separated, and FIG. 13B shows them assembled. Stator 36 has annular core 41 with poles 42 and with coils 37 interspersed between poles 42. By considering FIGS. 1–4 and 13A–B together, it will be apparent that coils 37 protrude beyond stator core 41 in the radial direction (perpendicular to axis 48) but not in the axial direction (parallel to axis 48). This is a significant design feature since it allows the circumferentially directed stator reaction torque to be transferred from stator 36 to stator support 88 by means of coils 37 engaging stator support 88. Coils 37 are preferably wound from a flat ribbon and therefore possess significant lateral (circumferential) strength. Thus, coils 37 can withstand significantly larger circumferentially directed forces than would be possible with wire wound coils.

Annular shaped stator support 88 preferably but not essentially has hollow interior 90 through which coolant 91 circulates. Inwardly extending from stator support 88 are tooth-like protrusions 92 shaped and spaced so as to fit intimately between coils 37 and in close proximity to core 41 of stator 36, as can be seen in FIG. 13B. This arrangement provides low thermal impedance so that heat may be readily extracted from coils 37 of stator 36 as shown by arrows 93 and from poles 42 of core 41 of stator 36 as shown by arrows 95. In the preferred embodiment, stator support 88 is attached to stator 36 by a thermally conductive epoxy, as for example, insertion molded or cast thermally conductive plastic or equivalent material 99 placed between protrusions 92, coils 37 and pole pieces 42 of core 41. This insures intimate thermal contact between support 88 and stator 36. Stycast Type 2850 MT epoxy resin supplied through Emerson and Cuming of Canton, Mass., USA is a non-limiting example of suitable thermally conductive material 99. Stator support 88 also reacts the circumferentially directed forces created by motor 30 by means of, for example, attachment rings 88A, 88C and housing 113 shown in FIG. 14 by which motor 30 is coupled to the vehicle frame (not shown). Attachment rings 88A, 88C and housing 113 of FIG. 14 are non-limiting examples of how stator support 88 can be attached to the vehicle. Persons of skill in the art will understand based on the description herein that this is merely by way of illustration and not intended to be limiting and that the particular means for fixedly attaching stator support 88 to the vehicle will depend upon the particular vehicle configuration.

FIG. 14 shows a partially cut-away and simplified cross-sectional view through traction motor assembly 112 of the present invention with motor 30 comprising rotors 32, 34, rotor support 70, stator 36, stator support 88 and housing 113, assembled in functional relationship. Internal ring structure 88A is conveniently fixedly attached to stator support 88. External ring or plate 88C is conveniently attached to ring 88A by bolts 88D, as for example by engaging threads 88B, but this is not essential. Any suitable means of attachment may be used. External ring or plate 88C is in turn fixedly attached to housing 113 by any convenient means. In this way, the reaction torque of motor 30 is transferred from stator 36 to external housing 113 and eventually to the vehicle frame. The exact manner of attachment of external housing 113 to the vehicle frame will depend upon the particular vehicle configuration and is omitted here.

Centrally located output shaft 114 is conveniently coupled to web portion 67 of rotor support 70, for example, by bolts 77AA engaging threaded holes 77A, but this is not essential. Any means of coupling rotor web 67 to output shaft 114 of motor 30 of assembly 112 may be used. Further, while the construction and operation of motor 30 and motor assembly 112 have been described in terms of rotor support 70 being coupled to the wheel and stator support 88 being coupled to the vehicle frame, this is merely for convenience of description and not intended to be limiting. The connection of motor 30 and motor assembly 112 between the wheel and vehicle frame could equally well be reversed, that is, stator support 88 can be coupled to the wheel and rotor support 70 can be coupled to the vehicle frame. Either arrangement is useful.

The upper half of FIG. 14, that is, above axis of rotation 48 shows interior region 69 of motor assembly 112 wherein rotors 32, 34 with PMs 33, 35 and cooling holes 75, rotor support 70 with attachment holes 77A and mass reduction holes 77B, and alignment regions 72, 74, stator 36 with coils 37 and pole pieces 42 of core 41, stator support 88 with cooling chamber 90 and inwardly directed teeth 92 for engaging coils 37 and pole pieces 42 and so forth, are arranged in functional relationship. The lower half of FIG. 14, that is, below axis of rotation 48, shows exemplary housing 113 surrounding interior region 69. Bearings 115, 115' are desirably provided within or adjacent to housing 113 to support and align output shaft 114 (and therefore rotors 32, 34) with respect to housing 113 and stator support 88. Bearings 115, 115' have inner races 116, 116' coupled to machine output shaft 114 and outer races 118, 118' coupled to housing 113, which is in turn coupled to stator support 88. Ball-bearings 117, 117' roll between races 116, 118 and 116', 118' respectively. By fixedly attaching races 116, 116' to output shaft 114 and races 118, 118' to housing 113, gaps 94, 94' between PMs 33, 35 and stator pole pieces 42, 42' are established and maintained at the proper size. Housing 113 with bearings 115, 115' is intended to be merely exemplary and not limiting. Persons of skill in the art will understand based on the description herein that the mechanical arrangement for supporting rotors 32, 34 with respect to stator 36 may vary depending upon the particular vehicle or other apparatus to which motor 30 and assembly 112 is being applied. Accordingly a wide variety of housing and support arrangements may equally well be used and the claims that follow are not intended to be limited merely to the examples presented herein for purposes of explanation.

Figure 15:
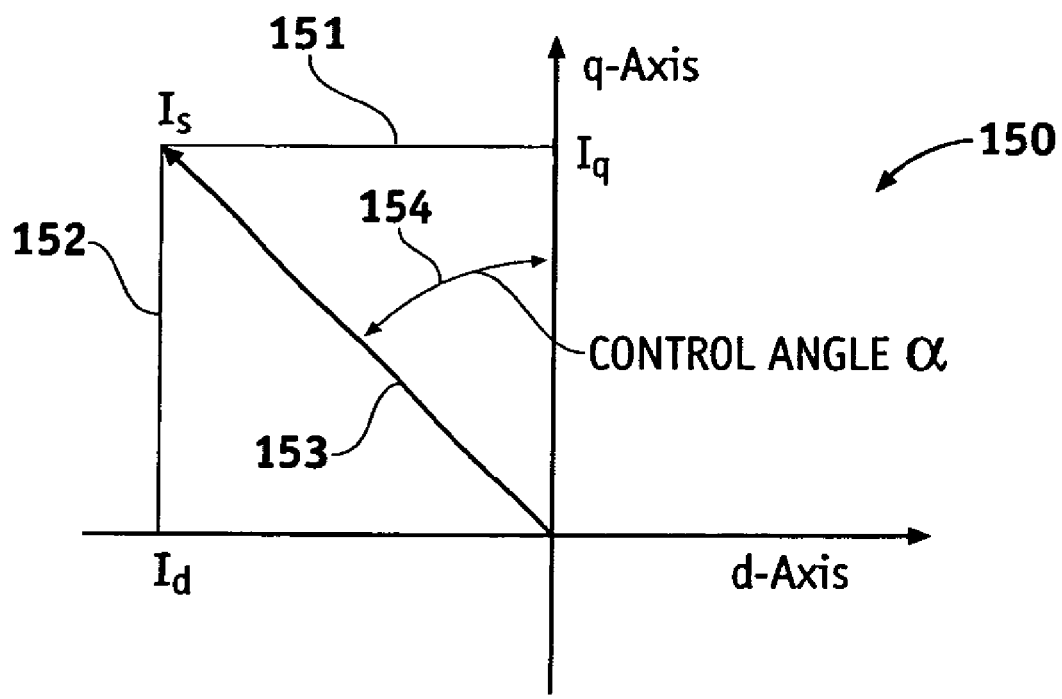
FIG. 15 is a simplified representation of the d-q magnetic axes used in analyzing the motor of the present invention.

The electrical and magnetic operation of motor 30 will now be described in more detail. In a Y-connected three-phase machine with no neutral wire, the sum of the three phase currents $I_a$, $I_b$, $I_c$ is zero. Therefore, the actual number of variables is two and the third phase current can be calculated from the other two. In this way, a three-phase machine with phase currents $I_a$, $I_b$, $I_c$ can be represented mathematically by two phases. This two-phase representation is well known in the art as the d-q representation, where machine behavior can be described in terms of quadrature currents $I_d$, $I_q$ where the d-axis is customarily aligned with the permanent magnet axis and the q-axis leads the magnet axis by 90 degrees electrical. This is illustrated in FIG. 15, which provides a simplified representation of the d-q magnetic axes used in analyzing the motor of the present invention. The control angle $\alpha$ is the electrical angle between the phase current $I_s$ and the q-axis current $I_q$. The phase current $I_s$ is the vector sum of d and q axes currents $I_d$, $I_q$, For sinusoidal phase currents, $I_s$ is the peak of the phase current. In general for positive values of the control angle $\alpha$, the d-axis current $I_d$ is negative, that is, it opposes the PM field. It is well known in the art to represent the operation of a PM multi-phase motor in terms of $I_d$, $I_q$ and $\alpha = \arctan(-I_d/I_q)$.

The invented control technique can be implemented for a PM machine, both surface and interior type and makes it possible to maximize performance indices of the system such as efficiency, torque per ampere, etc. By providing improved field weakening the control regulator (illustrated in FIGS. 20A–B, 22) can transition into the non-linear (over modulation) region of operation with operation close to the six-step or square wave mode of control Six-step control of a three-phase PM motor is well known in the art and is described for example, in *Power Electronics, Converters, Applications, and Design, Second Edition,* by Ned Mohan et al published by John Wiley and Sons, Inc. New York, N.Y. In the six-step mode of control, timed current pulses are supplied to combinations of two of the three phases, which combination changes every sixty electrical degrees as the rotor turns. By allowing transitions into the non-linear region of operation the improved controller of the present invention improves both high-speed power and efficiency. The invented arrangement works especially well for a strong flux machine such as the axial flux machine of the present invention and works well in the presence of harmonics such as slot harmonics or winding harmonics. The torque command T*, motor speed $\omega_r$, bus voltage Vdc and stored machine properties are used to determine the optimum phase currents for efficient operation. The current commands are calculated using the current and voltage limits of the system while utilizing them efficiently. These feed-forward current commands can then be used for control of the machine and, since they are calculated using the voltage and current limits, ideally they are adequate to control the machine even during high-speed, field weakening operation. However, due to variations of the machine model parameters and the actual machine parameters, some deviation is expected and so a feedback field weakening term is provided to correct the error between the commanded current and the actual required current. Because the invented control approach uses the actual machine properties, the correction term is generally small and a smooth transition into the over-modulation region is obtained. With respect to the variables mentioned herein, the convention is adopted of adding a superscript (*) to a quantity to indicate that it is a commanded quantity. For example, T represents the actual machine torque and T* represents the commanded torque, that is, the torque command issued by the user to the motor controller; $I_d$ represents the actual d-axis current and $I_d$* represents the commanded d-axis current, that is, the d-axis current requested by the controller logic, and so forth for the other variables.

Figure 16A:
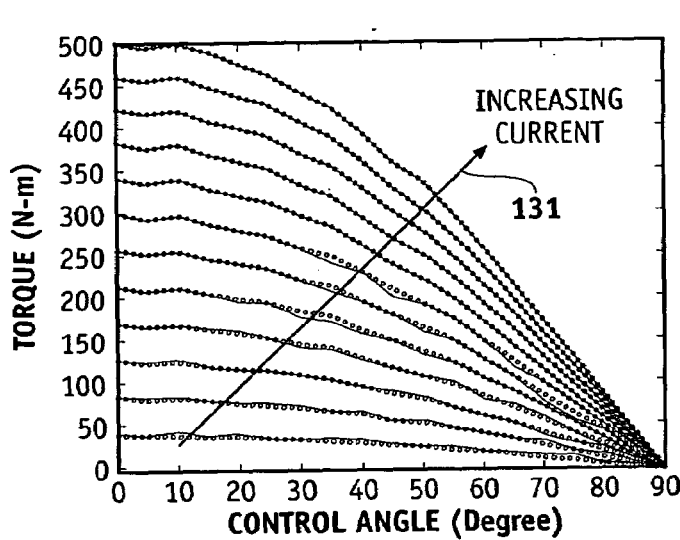
FIG. 16A is a plot of observed and calculated motor torque versus control angle α and FIG. 16B is a plot of calculated d-axis flux versus control angle and FIG. 16C is a plot of calculated q-axis flux versus control angle, for the motor of the present invention.
Figure 16B:
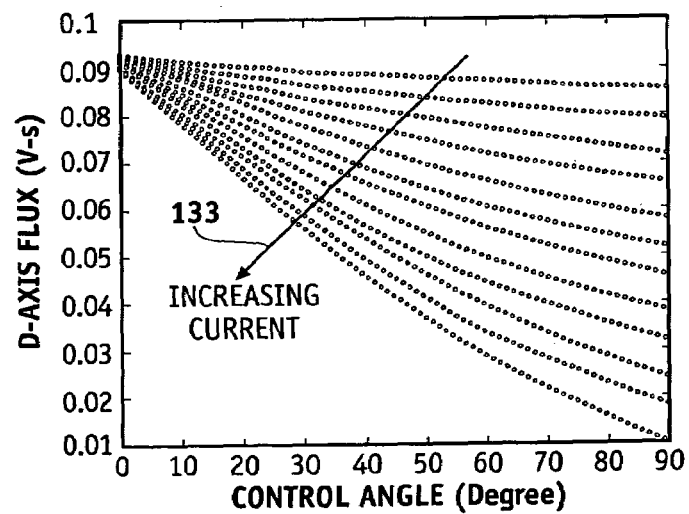
Figure 16C:
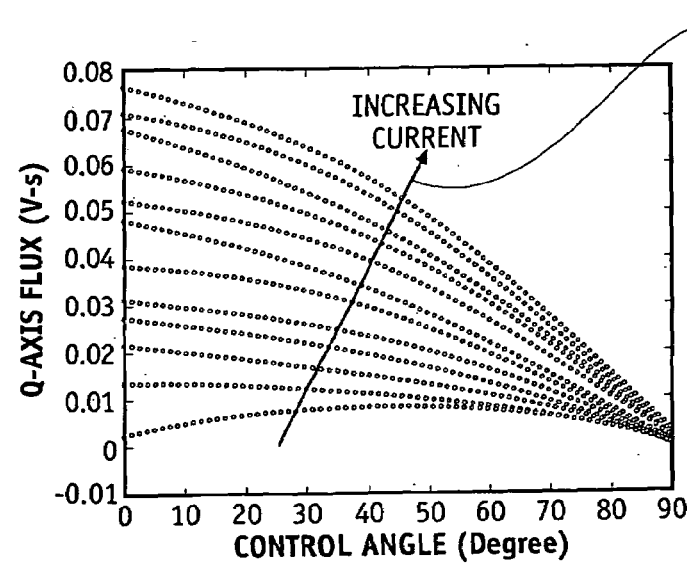

FIG. 16A shows curves 130 of the calculated and observed torque of motor 30 as a function of control angle $\alpha$, FIG. 16B shows curves 132 of calculated d-axis flux as a function of control angle $\alpha$, and FIG. 16C shows curves 134 of calculated q-axis flux as a function of control angle $\alpha$, at different values of current. Positive current increases in the directions of arrows 131, 133, 135. The machine (motor) characteristic data such as is illustrated in FIGS. 16A, 16B and 16C are used to develop a non-linear model of the machine that includes both saturation and cross saturation effects. Once the non-linear model is created it is used to search for the optimized control parameters and the d-axis and q-axis current commands, using the methodology illustrated in FIG. 17. For each torque T, speed $\omega_r$ and bus voltage $V_{dc}$ there exists a unique set of control parameters $I_d$, $I_q$ that maximize the machine performance indices. This model searches for these control parameters for all machine torque-speed operational points for different bus voltages. As will be subsequently explained, the resulting optimized control parameters are stored in look-up tables that are employed by motor control system 160 (see FIG. 20) of the present invention, for operating the motor.

Figure 17:
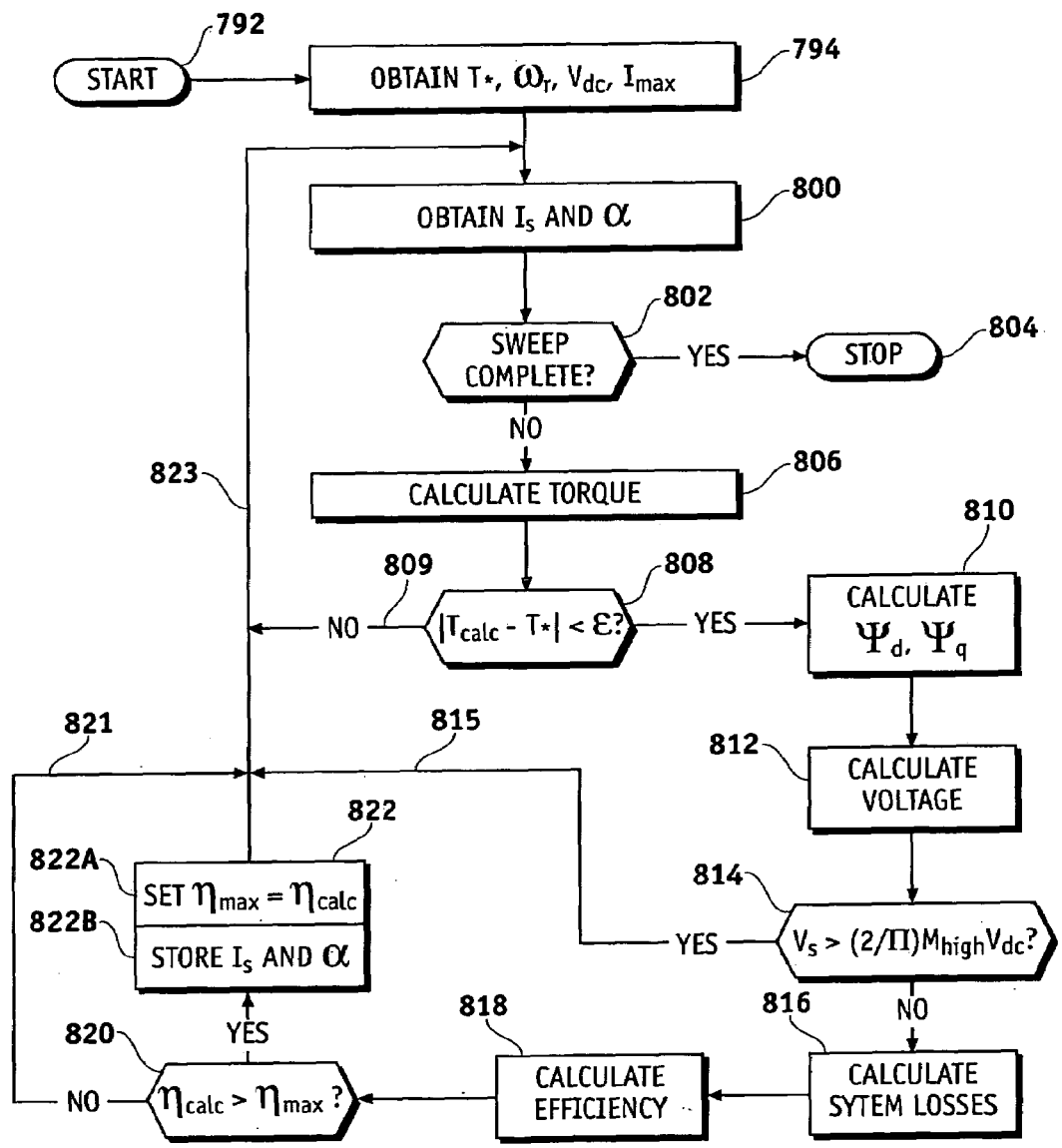
FIG. 17 is a flow chart illustrating a method for calculating optimized control parameters for the motor of the present invention.

FIG. 17 illustrates method 790 for calculating optimized control parameters. This method is preferably offline and can be carried out, for example, by computational system 500 of FIG. 22 or any other computer system supplied with the needed input data. The calculated control parameters thus obtained are added as look-up table, e.g., stored in memory 506 in real time machine controller 500 (see FIG. 22). Method 790 begins with START 792. In initial step 794 the inputs are the values of the torque command (T*), the rotor speed ($\omega_r$), the dc-bus voltage ($V_{dc}$) and the maximum inverter peak current ($I_{max}$), for which the control parameters (d- and the q-axes currents) are to be calculated. Method 790 calculates the optimized control parameter for all torque-speed (T-$\omega_r$) operating points of the machine for a range of operating battery voltages ($V_{dc}$). All these control parameters are then stored in memory 506 of real-time controller 500 as, for example, in lookup tables. $I_{max}$ is an upper limit of the phase current, usually imposed by the inverter thermal limit. All the control parameters have to be calculated for operating within the supply voltage ($V_{dc}$) and the current limit ($I_{max}$). In step 800, a standard root seeking procedure, such as the method of bisections, etc., is executed to determine the control parameters $I_s$ and $\alpha=\arctan(-I_d/I_q)$ (see FIG. 15), operating within the inverter maximum current $I_{max}$ and dc bus voltage $V_{dc}$, needed to produce the commanded torque T*. Query 802 is then executed to determine whether all possible control parameters, all currents (i.e., from 0 to $I_{max}$) and all control angles (i.e., from 0 to 90 degrees), are considered to make sure that the optimal combination is selected. If the outcome of query 802 is YES (TRUE), meaning that all possible combinations have been considered, then method 790 terminates at STOP 804. If the outcome of query 802 is NO (FALSE), meaning that all possible combinations have not yet been considered, then method 790 proceeds to Calculate Torque step 806 where the torque $T_{calc}$ is calculated for the current choice (from block 800) of the control parameters $I_s$ and $\alpha$. To calculate torque $T_{calc}$ the machine characterization data of FIG. 16A is used. Query 808 is then executed to determine whether the absolute difference between the calculated torque $T_{calc}$ and commanded torque T* is less than a predefined small number $\epsilon$. In the preferred embodiment, $\epsilon$ is selected such that the calculated torque $T_{calc}$ is within 0.1% of the commanded torque T* or less. Higher or lower values of $\epsilon$ can also be used depending on the level of accuracy desired. If the outcome of query 808 is NO (FALSE) then method 790 returns to block 800 and selects another set of control parameters $I_s$ and $\alpha$ for the commanded operating point (T*, $\omega_r$) and the voltage and current limits ($V_{dc}$ and $I_{max}$) and repeats steps 800–808 until the outcome of query 808 is YES (TRUE) or STOP 804 occurs, i.e. the outcome of block 802 is YES (TRUE), which means that all the control parameters ($I_s$ varying from 0 to $I_{max}$ and control angle $\alpha$ varying from 0 to 90 degrees) have been checked for a valid set of control parameter. If the outcome of query 808 is YES (TRUE), meaning that a useful set of control parameters has been found that will produce the desired commanded torque T* at the machine output, then method 790 proceeds to step 810 where the d-axis and the q-axis flux linkages, $\psi_d$, and $\psi_q$, respectively, are determined. To compute the machine flux linkages the characterization data of FIGS. 16B and 16C are used. The control parameter($I_s$ and $\alpha$) selected by the steps 800–808 produce the commanded torque T* operating within the current limit of $I_{max}$. However, the voltage limit imposed by the battery voltage $V_{dc}$ also needs to be considered. The next few steps calculate the machine terminal voltage and check whether the machine voltage stays within the battery voltage $V_{dc}$. For a bus voltage of $V_{dc}$ the maximum phase voltage available to the machine is $(2/\pi) \times V_{dc}$, this mode is called the six-step mode, where the full battery voltage is applied between machine terminals. In the preferred embodiment, the full six-step mode is not used but approximately 95% of the six-step mode voltage. The constant $M_{high}$ (see Table I) in block 814 is selected accordingly. Calculate Voltage step 812 is then executed wherein the machine phase voltage $V_s$ (defined in Eq. [4]) is calculated using the flux linkages determined in step 810 and Eqs. [2]–[5] described later. Then query 814 is executed wherein the peak of the phase voltage $V_S$ is compared to the dc-bus voltage $V_{dc}$ multiplied by a constant $(2/\pi) \times M_{high}$. The quantity $(2/\pi) \times V_{dc}$ is the maximum phase voltage available to the machine for a battery voltage of $V_{dc}$. This mode is known as the six-step mode. The constant $M_{high}$ defines the inverter limit in the over-modulation region as will be explained in more detail later in connection with Table I and FIGS. 20A–B. If $M_{high}$ is set to 1, inverter 182 (see FIG. 20) operates in six-step mode. In the preferred embodiment $M_{high}$ is set to ~0.95, which means that inverter 182 is operating at 95% of the six-step voltage limit. Inverter 182 operates in six-step when full bus voltage $V_{dc}$ is applied to the terminals of machine 30 in FIGS. 20A–B. While the preferred value of $M_{high}=0.95$, useful values are in the range of $0.90 \geq M_{high} \geq 1.0$ and more conveniently $0.92 \geq M_{high} \geq 0.98$. If the outcome of query 814 is YES (TRUE), which means that the selected control parameters would require more inverter voltage than available, then method 790 returns to block 800 as shown by paths 815, 823 where a further set of control parameters is selected. If the outcome of query 814 is NO (FALSE), then the current set of control parameter will achieve the commanded torque without exceeding the current and the voltage limits of $I_{max}$ and $V_{dc}$ respectively. In subsequent step 816 the system losses (machine, inverter, etc.) are calculated and in step 818 the system efficiency is calculated. The losses are the sum of the inverter loss (IL) and the machine loss (ML), that is $\Sigma(IL)+(ML)$. Persons of skill in the art will understand how to determine these losses. The efficiency $\eta$ is given by the equation $\eta=[(\omega_r \times T^*)/(\omega_r \times T^* + \Sigma(IL) + (ML))]$. Query 820 is then executed to compare the currently computed efficiency $\eta_{calc}$ with the largest efficiency value $\eta_{max}$ obtained with a previous valid set of control parameters. If the outcome of query 820 is NO (FALSE) indicating that the current efficiency is less than a previously computed efficiency, then method 790 returns to block 800 as shown by path 821, 823 to select another set of control parameters. If the outcome of query 820 is YES (TRUE) then method 790 proceeds to step 822 wherein the current set of control parameters $I_s$ and $\alpha$ are stored and $\eta_{max}$ is set equal to the current value $\eta_{calc}$ and the new value of $\eta_{max}$ is also stored, as for example in memory 506 of system 500 (see FIG. 22). Sub-steps 822A and 822B may be executed in either order. Following completion of step 822, method 790 returns to block 800 as shown by path 823. Method 800–823 repeats until the whole control range ($I_s$ varying 0 to $I_{max}$ and control angle $\alpha$ varying 0 to 90 degrees) is checked for the optimal control parameters. The above-described process should yield a valid set of control parameter ($I_s$, $\alpha$) that maximizes the system efficiency for the required machine operating point ($T^*$, $\omega_r$) and voltage and current limits ($V_{dc}$ and $I_{max}$). The whole process starting from the selection of another operating point (block 794) to the end should be carried out for all machine operating point (e.g., the entire torque-speed plane) and operating ranges of the battery voltages. Once all the control parameters are obtained, they are stored in memory 506 of real time controller 500, e.g., as look-up table 162 of FIGS. 20A–B.

Figure 18A:
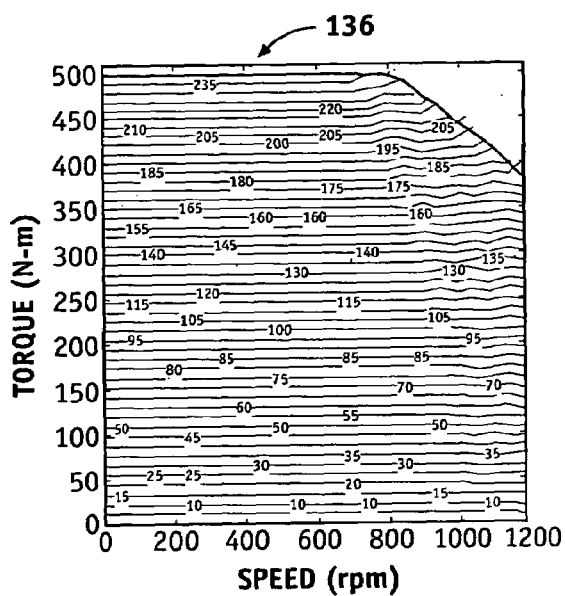
FIGS. 18A–B are plots of torque versus speed for different values of the optimal control parameters, the d- and the q-axes currents $I_d$, $I_q$, wherein FIG. 18A has optimized $I_q$ as the parameter and FIG. 18B has optimized $I_d$ as the parameter.
Figure 18B:
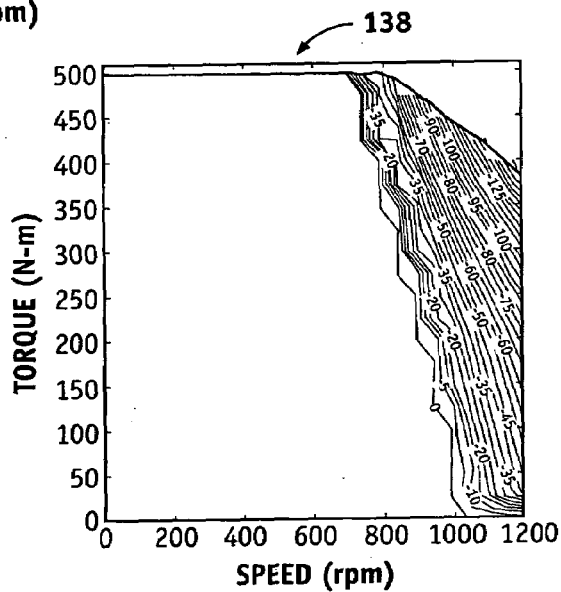

FIGS. 18A and 18B show curves 136, 138 of torque versus speed for optimal control parameters, the d- and the q-axes current commands respectively, for all torque-speed operating points of the machine whose characteristics are shown in FIGS. 16A–C. The bus voltage Vdc is 250 volts. These illustrate a typical set of optimum control parameters for the PM machine of FIG. 14, which maximize the drive system efficiency $\eta$. Curve 136 of FIG. 18A shows constant current contours of the q-axis current command and curve 138 of FIG. 18B shows constant current contours of the d-axis current command. The parameter values on the various curves are $I_q$ values in FIG. 18A and $I_d$ values in FIG. 18B.

Figure 22:
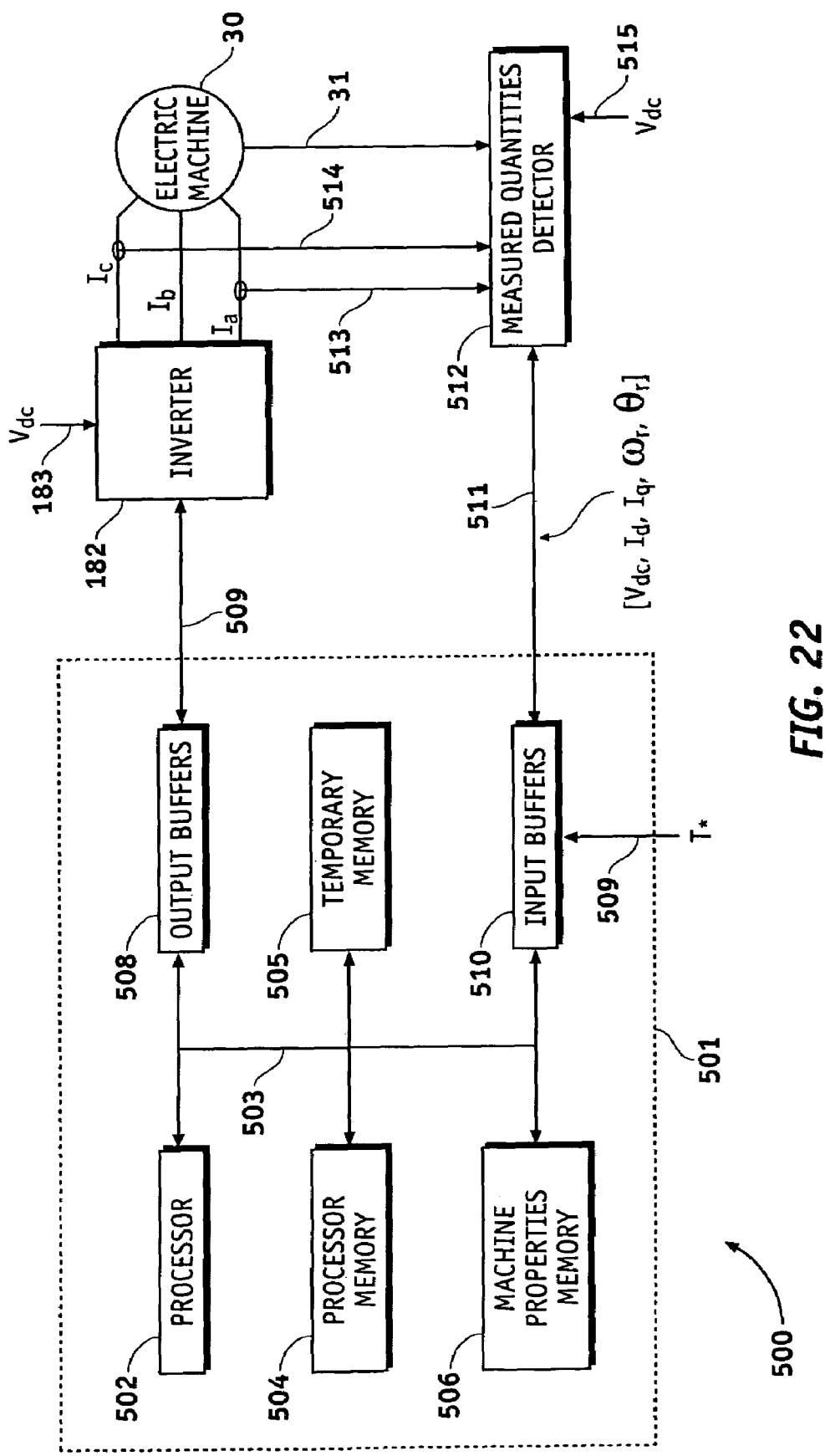
FIG. 22 is a simplified schematic diagram of a computer based system suitable for carrying out the control processes of the present invention.

Optimal control parameters are calculated for several bus voltages and for both motoring and regeneration operations. As will be subsequently explained in more detail, these control parameters are stored in look-up tables available to motor control system 160 (FIGS. 20A–B) and system 500 (FIG. 22). It is important to calculate look-up tables for motoring and regenerating operations separately. For the same torque-speed operating point, the machine terminal voltage during regeneration operation is lower than for motoring operation due to reverse direction of current flow. As a consequence, more torque is available during field weakening regeneration operation as compared to the motoring operation.

Figure 19:
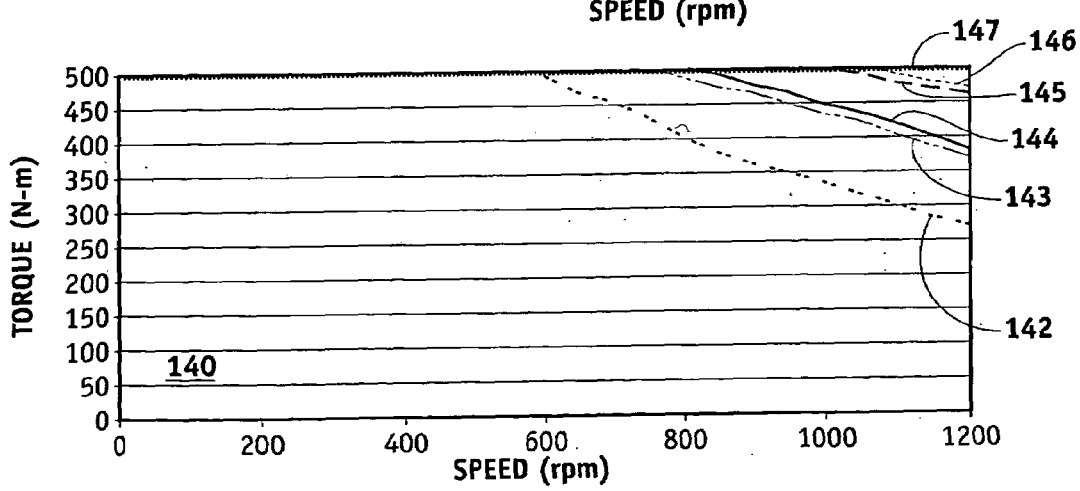
FIG. 19 is a plot of observed torque versus speed under various operating conditions for the motor according to the preferred embodiment of the present invention.

FIG. 19 shows plot 140 of observed torque versus speed under various operating conditions for machine 30 according to the preferred embodiment of the present invention. Curve 142 corresponds to motoring at Vdc=184 volts, curve 143 generating at Vdc=184 volts, curve 144 motoring at Vdc=250 volts, curve 145 generating at Vdc=250 volts, and curve 146 motoring at Vdc=316 volts and curve 147 generating at Vdc=316 volts. It is clear that at high speed significantly more power (torque×speed) is available during regenerating operation as compared to motoring operation for the same bus voltage Vdc.

Figure 20A:
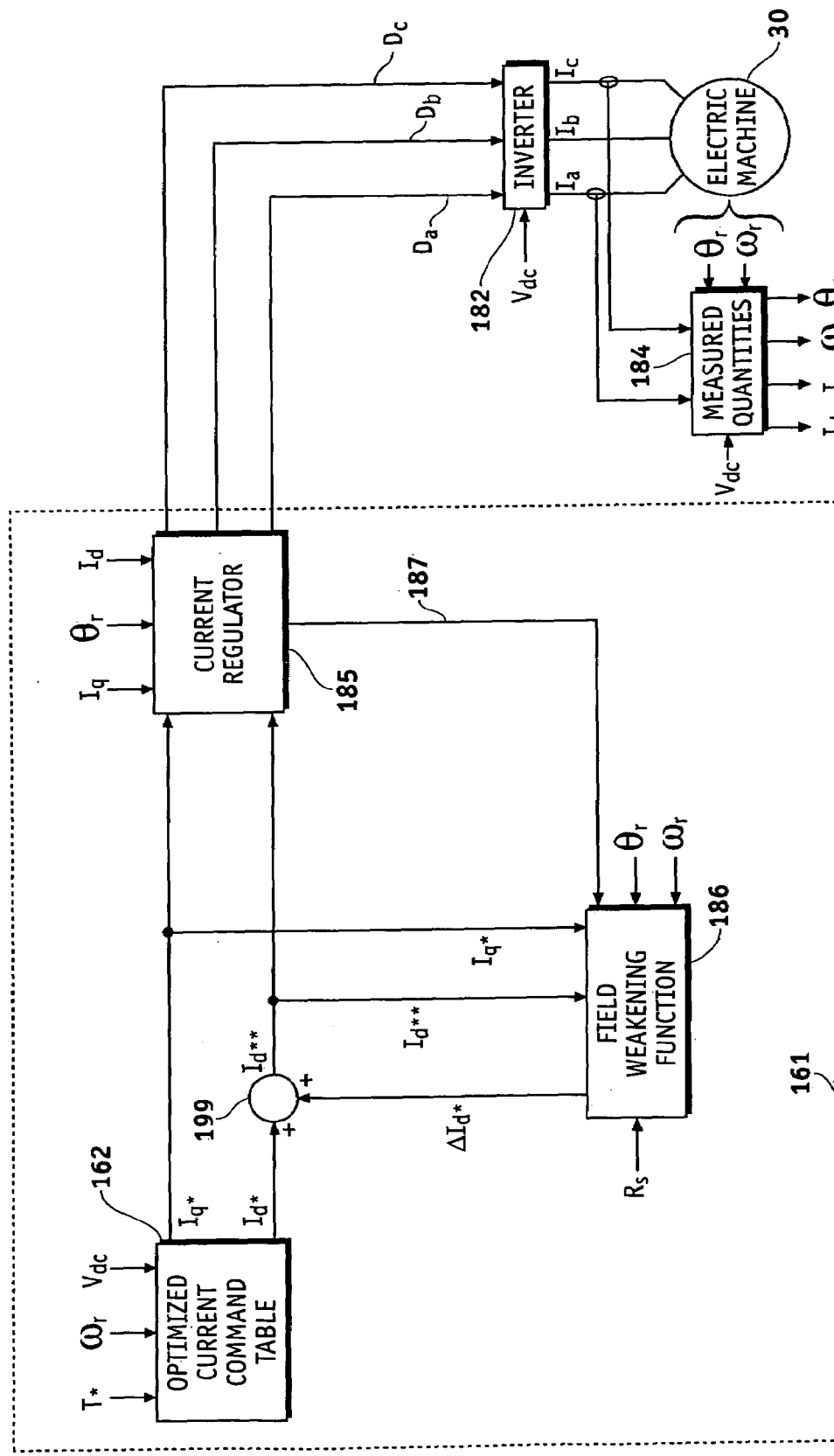
FIGS. 20A–B are simplified block diagrams of a motor control system process architecture according to a preferred embodiment of the present inventions, wherein FIG. 20A provides an overview and FIG. 20B provides further detail.
Figure 20B:
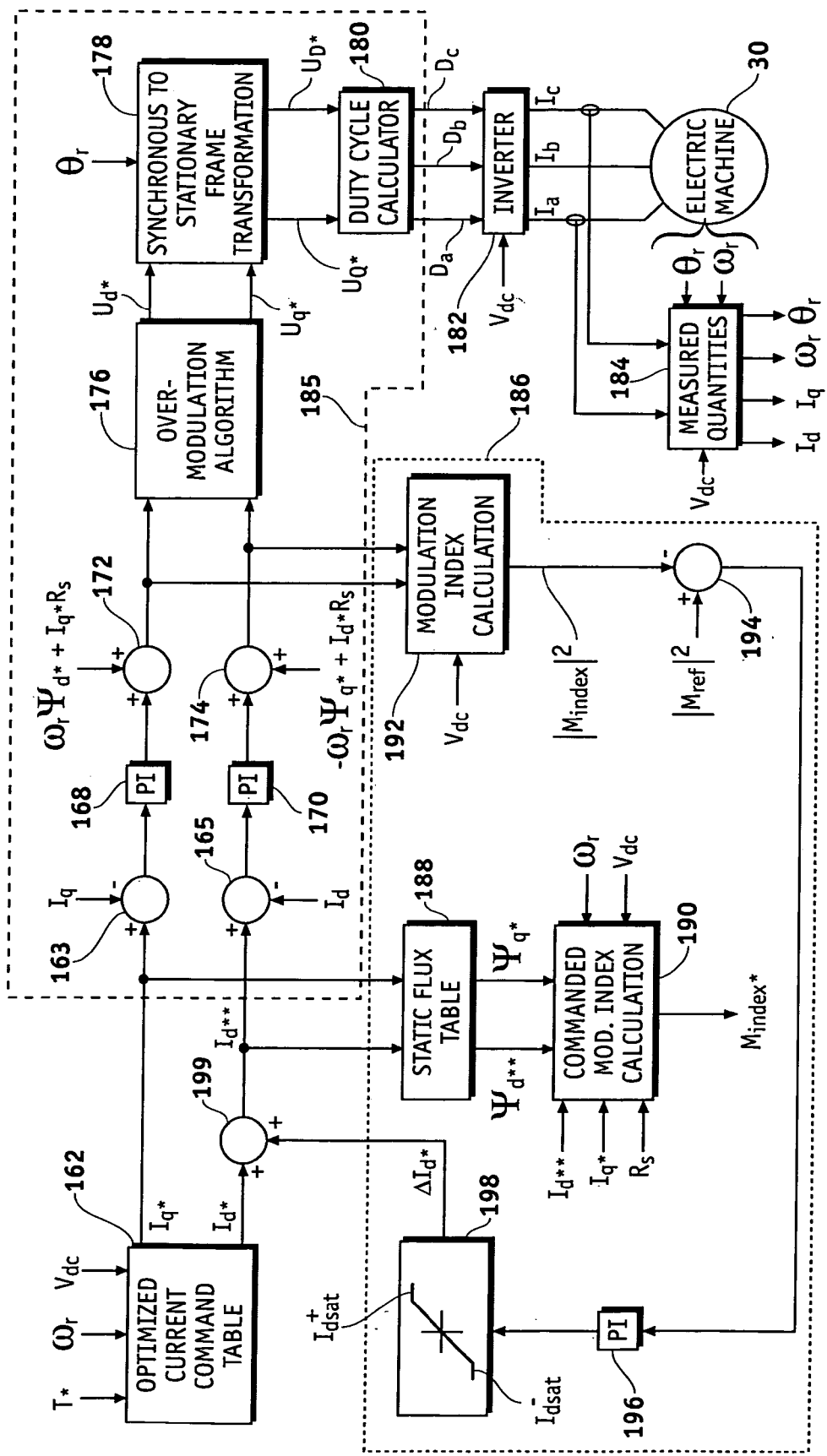

FIGS. 20A–B are simplified block diagrams of a motor control system process architecture 160 according to a preferred embodiment of the present inventions, wherein FIG. 20A provides an overview and FIG. 20B provides further detail. The hardware for performing the functions illustrated in FIGS. 20A–B is shown in FIG. 22. The control system of the present invention achieves two objectives: first, to maximize machine performance and second, to utilize the DC bus voltage $V_{dc}$ effectively at high speed. The first objective is achieved by the optimized control table in block 162. The second objective is achieved by the field weakening provided by feedback module (field weakening function) 186 in cooperation with optimized control parameter block 162. In a permanent magnet (PM) machine, the PM flux is always present. When the rotor rotates, the rotating magnet flux induces voltage in the stator windings, which is called the back electromotive force (back-emf). As the speed becomes higher and higher, the back-emf also increases. Above a certain speed the back-emf may exceed the DC bus voltage $V_{dc}$. At that point, control of the current through the machine is no longer possible. Therefore there is a need to reduce the magnet flux to reduce the back-emf so that the machine current can be controlled. This reduction in magnet flux is referred to as field weakening. In a PM machine, the PM flux itself cannot be reduced, therefore a negative d-axis current is injected into the machine at high speeds to counteract a portion of the PM flux, thereby reducing the back-emf. Control function 160 carried out by real time controller 501 is particularly effective and allows greater than 95% utilization of the bus voltage with stable control and good control response. The following parameters are defined for use in connection with control function 160 of FIGS. 20A–B and control system 500 of FIG. 22:

$T^*$: Torque Command $\omega_r$: Rotor Speed in rad/sec $\omega_e$: Electrical frequency in rad/sec $\theta_r$: The measured or estimated rotor position
$V_{dc}$: DC Bus Voltage
$I_d$: d-axis current
$I_d^*$: d-axis current command
$I_d^{**}$: Modified (by the field weakening block 186) d-axis current command
$I_q$: q-axis current
$I_q^*$: q-axis current command
$\psi_d$: d-axis flux linkage (flux linkage is the flux linking a coil created by another coil carrying current or a permanent magnet)
$\psi_d^*$: d-axis flux created by the d-axis current command $I_d^*$
$\psi_d^{}$: d-axis flux created by the modified d-axis current command $I_d^{}$
$\psi_q$: q-axis flux linkage
$\psi_q^*$: q-axis flux created by the q-axis current command $I_q^*$
$R_s$: Machine per phase resistance
$U^*_d$: d-axis voltage command (to the inverter)
$U^*_q$: q-axis voltage command
$U_D^*$: d-axis voltage in the stationary frame
$U_Q^*$: q-axis voltage in the stationary frame
$M_{index}$: Modulation index, which defines the amount of voltage utilized by the inverter. (A modulation index of 1 indicates 100% utilization of the dc bus voltage.)
$M^*_{index}$: Modulation index command
$M_{ref}$: Reference modulation index. This defines the amount of voltage to be utilized by the inverter
$M_{low}$: A lower threshold value for $M_{index}$
$M_{high}$: A higher threshold value for $M_{index}$
PI: Proportional plus Integral controller.

Optimized current command table 162 receives inputs T*, $\omega_r$, and $V_{dc}$ defined above. Table 162 is conveniently a look-up table, which is determined off-line using the methods discussed in connection with FIGS. 16–19, wherein examples of optimized control parameter data are shown. The measured data defines the conditions that result in optimum performance, as for example, optimum efficiency, and include injecting negative d-axis current at high speed for field weakening. Based on: (i) the actual rotor speed $\omega_r$ obtained from measured quantities function 184 of FIGS. 20A–B (and hardware block 512 of FIG. 22), (ii) user input commanded torque T*, and (iii) DC bus voltage $V_{dc}$ obtained from measured quantities function 184 of FIGS. 20A–B (and hardware block 512 of FIG. 22), table 162 provides the commanded d-axis current $I_d^*$ and the commanded q-axis current $I_q^*$ that should achieve the commanded torque T* at speed $\omega_r$. $I_d^*$ provides stability to the current regulation by lowering the machine back emf voltage at high speed. Ideally, $I_d^*$ from 162 above is sufficient to lower the back emf and provide stability to the current regulator. However, any deviation between the optimized command table parameters and actual machine performance is taken care of by field-weakening correction function 186 described in more detail later. Function 186 provides error correction term $\Delta I_d^*$ which is added to $I_d^*$ in SUM function 199. This modified d-axis current is referred to as $I_d^{}$ that is, $I_d^{}=(I_d^*+\Delta I_d^*)$. The $I_q^*$ output of function 162 and the $I_d^{**}=(I_d^*+\Delta I_d^*)$ output of SUM function 199 are fed to current regulator 185, which computes the necessary drive duty cycles $D_a$, $D_b$, $D_c$ for inverter 182 that, in turn, drives machine 30. Feedback 187 (see FIG. 20A) is provided by current regulator 185 to field weakening function 186 so that the output of regulator 185 is adjusted (by modifying the commanded d-axis input current) to optimize overall performance and take into account small variations in machine properties.

Referring now to FIG. 20B, the $I_q^*$ output of block 162 and the $I_d^{**}=(I_d^*+\Delta I_d^*)$ output of SUM block 199 are fed to SUM functions 163, 165 respectively, where the actual values $I_d$, $I_q$ obtained from measured quantities function 184 are subtracted, giving the differences (errors) between the command value and actual values, which errors are then fed to PI functions 168, 170. Functions 168, 170 are proportional plus integral (PI) controllers, which are well known in the art. A properly designed PI controller will drive the above-noted current errors to zero by appropriately modifying the voltage applied to the machine. The outputs of PI functions 168, 170 are fed respectively to SUM functions 172, 174 where the data received from PI function 168 is summed with the quantity $(\omega_r \psi_d + I_q^* R_s)$ and the data received from PI function 170 is summed with the quantity $(-\omega_r \psi_q^* + I_d^* R_s)$, and the results fed to over-modulation function 176. The above two feed-forward terms are basically the respective axes (d- and q-axes) speed and resistive voltage terms. By adding these two terms feed-forwardly to the current control loop, the dynamics of the current regulators are improved. Over-modulation is a technique by which inverter 182 moves from operation in the linear region to operation in a non-linear region to maximize the voltage fed to the machine. There are several over-modulation techniques known in the art. Function 176 implements an algorithm described by Holtz et el in *IEEE Transactions on Power Electronics*, Vol. 8, No. 4, October 1993, pp. 546–553. This algorithm continuously and smoothly varies inverter fundamental output voltage with the modulation index up to its operation at full six-step. Function 176 insures that inverter 182 continues to provide stable control of phase currents $I_a$, $I_b$, $I_c$ even at high values of modulation index $M_{index}$ when inverter 182 is no longer linear in operation. Modulation index $M_{index}$ is a measure of the inverter peak AC output versus the DC input $V_{dc}$. $M_{index}=0$, means that the AC output voltage supplied by inverter 182 is zero and $M_{index}=1.0$, means that the full battery voltage $V_{dc}$ is being applied to the machine terminal (this mode is also known as six-step mode). Up to about $M_{index}=0.9069$ where inverter 182 is delivering 90.69% of the battery voltage to its output AC waveforms, operation of inverter 182 is substantially linear. Beyond that it is non-linear. Block 176 utilizes the algorithm of Holtz et al (ibid) to insure that operation in this region is still stable and provides d and q axis voltage commands $U^*_d$, $U^*_q$, respectively, which are fed to synchronous to stationary frame transformation function 178.

The approximately sinusoidal signals being supplied to machine 30 have a certain frequency. If an observer sits near the peak of the sine wave and rotates at the same frequency, the signal appears to be stationary in time. This is referred to in the art as the "synchronous frame" as opposed to the "stationary frame" where the observer sees the actual time varying AC signals. In the synchronous frame the synchronous AC quantities appear as DC quantities and are therefore easier to control. The phase current $I_s$ and its d-axis and q-axis components $I_d$ and $I_q$ are actually sinusoidal but in the synchronous frame appear as DC quantities. Function 178 converts these synchronous frame DC quantities back to substantially sinusoidal AC quantities in the stationary (real-time) frame. Function 178 yields outputs $U_D^*$ and $U_Q^*$ which are fed to duty cycle calculator block 180. D and Q are the stationary counterpart of the synchronous frame quantified d and q. The following expression is used to convert synchronous frame quantities into stationary frame and vice versa $$\begin{bmatrix} x_D \\ x_Q \end{bmatrix} = \begin{bmatrix} \cos(\theta_r) & -\sin(\theta_r) \\ \sin(\theta_r) & \cos(\theta_r) \end{bmatrix} \begin{bmatrix} x_d \\ x_q \end{bmatrix} \quad [1]$$

where x is any machine variable such as the machine voltage, current, etc., and $\theta_r$ is the rotor position. Inverter 182 is conventional. Inverter 182 conveniently operates by pulse width modulation (PWM). Duty cycle calculator 180 determines the width of the pulses to produce the desired voltage (at the output of the inverter) as commanded by the current regulator. The wider the pulses (greater duty cycle) the greater the voltage and therefore the greater the output currents. Function 180 calculates the inverter duty cycles $D_a$, $D_b$, $D_c$ for each phase a, b, c needed in response to inputs $U_D^*$ and $U_Q^*$ so that inverter 182 will produce the commanded voltages $U_D^*$ and $U_Q^*$ at the machine terminals to produce the desired phase currents $I_a$, $I_b$, $I_c$. $D_a$, $D_b$, $D_c$ are fed to inverter 182. Inverter 182 receives $D_a$, $D_b$, $D_c$ and $V_{dc}$ and supplies the requisite voltage pulses to motor (machine) 30 to provide phase currents $I_a$, $I_b$, $I_c$. Measured quantities function 184 conveniently measures phase currents $I_a$, $I_c$ flowing from inverter 182 to machine 30 and from these two calculates phase current $I_b$. In a Y-configuration with no neutral, the vector sum of $I_a$, $I_b$, $I_c$ is zero, so any two phase currents are sufficient to determined the third. However, any means or method for determining $I_a$, $I_b$, $I_c$ may be used. Function 184 receives the battery voltage $V_{dc}$ and also conveniently receives (e.g., fed by a sensor) $\omega_r$ and $\theta_r$ from machine 30 but this is not essential. It is well known in the art that both quantities can be determined by an analysis of the phase currents or other means that do not require separate sensors on machine 30. Either arrangement is useful. Function 184 uses these inputs to calculate the corresponding values of $I_d$ and $I_q$. Function 184 is performed by measured quantities detector block 512 of FIG. 22.

The following describes field weakening correction function 186. For each current $I_s$ and its control angle $\alpha$ and hence for each d-axis and q-axis current, machine 30 produces certain d-axis and q-axis flux. The magnitude of these flux linkages does not change with speed and is therefore static in nature. These flux values are shown by curves 132, 134 in FIGS. 16B–16C. Static flux table function 188 calculates or looks up the commanded d-axis and q-axis flux linkages $\psi_d^{**}$, $\psi_q^*$ resulting from the modified d-axis and the q-axis current commands $I_d^{**}$, $I_q^*$ obtained from function 162. $I_d^{**}$ is the d-axis current command from function 162 plus any field-weakening correction term added in SUM function 199. The outputs of function 188 are fed to function 190, which calculates the commanded modulation index $M^*_{index}$ based on $I_d^{**}$, $I_q^*$, $R_s$, $\omega_r$, $V_{dc}$, and $\psi_d^{**}$, $\psi_q^*$, according to the following equations:

$$V_d^* = I_d^{**} R_s - \omega_e \psi_q^* \quad [2]$$

$$V_q^* = I_q^* R_s + \omega_e \psi_d^{**} \quad [3]$$

$$V_s^* = [(V_d^*)^2 + (V_q^*)^2]^{1/2} \quad [4]$$

$$M^*_{index} = (\pi V_s^*)/(2V_{dc}) \quad [5]$$

$M_{index}^*$ is used to calculate the limits applied in saturation function 198 and reference modulation index $M_{ref}$ which is explained later in connection with Table I.

Function 192 of field-weakening module 186 calculates the square of the magnitude of $M_{index}$. The output of functions 172 and 174 (which are the inputs of function 192) are the d-axis and the q-axis voltages that would be applied to the machine by the inverter. Using the equivalent equations of [4] and [5], $M_{index}$ is calculated. In the calculation of $M_{index}$ the actual voltages, to be applied by the inverter, are used as opposed to the commanded voltages used in equations [2]–[5]. The output of function 192 is fed to SUM 194 where $|M_{index}|^2$ is subtracted from $|M_{ref}|^2$, where $M_{ref}$ is the reference modulation index (see Table I), and the result fed to PI function 196. $M_{ref}$ defines the fraction of the available DC voltage that is to be used by inverter 182. PI function 196 produces the desired additional d-axis current feedback needed to match the modulation index $M_{index}$ to the reference modulation index $M_{ref}$. The output of PI function 196 is fed to non-linear compensator 198 wherein the upper and lower limits on the feed-back error current $\Delta I_d^*$ are set, according to Table I. The feed-back error current $\Delta I_d^*$ modifies the current $I_d^*$ fed by optimized command table 162. Ideally, the feed-back error current should be zero since function 162 should inject the right amount of d-axis current into the machine for field-weakening control at high machine speeds. However, the feed-forward control derived from function 162 by controller or current regulator 185 cannot guaranty stability, because there are sometimes variations between the machine parameters stored in function 162 and the actual machine due to aging effects, variation in operational condition such as temperature, variation from one machine to other due to manufacturing differences etc. Hence, field-weakening correction function 186 takes care of such variations by providing the correction term $\Delta I_d^*$ which is added to $I_d$ in SUM function 199.

The magnitude of $M_{ref}$ fed to block 194 and the setting of the $I_d$ limits in saturation block 198 activates or de-activates the voltage loops. This is explained in the following table. Three cases are considered. The logical operations defined in Table I are used to set the limits in blocks 198 and define the input $M_{ref}$ to the block 194.

TABLE I

Limit Settings

| Case # | Case | $M_{ref}$ | $I_{dsat}^+$ | $I_{dsat}^-$ | Voltage Loop |
|---|---|---|---|---|---|
| 1 | $M^*_{index} < M_{low}$ | $M_{high}$ | 0 | $-K_2|I_d^*|$ | Not Active |
| 2 | $M^*_{index} > M_{low}$ and $M^*_{index} < M_{high}$ | $M^*_{index}$ | $K_1|I_d^*|$ | $-K_2|I_d^*|$ | Active |
| 3 | $M^*_{index} > M_{high}$ | $M_{high}$ | $K_1|I_d^*|$ | $-K_2|I_d^*|$ | Active |

Case 1 ($M^*_{index} < M_{low}$)

$M_{ref}$ is set to $M_{high}$ and $I_{dsat}^+$ is set to zero. With these settings the error signal to the PI block 196 is positive and the output of voltage loop 186 is zero since the upper saturation limit in the saturation block 198 is set to zero. Thus, voltage loop 186 is deactivated. The negative saturation limit of block 198 has no consequence, however, for convenience it is set to $-K2|I_d^*|$.

Case 2 ($M^*_{index} \geq M_{low}$ and $M^*_{index} < M_{high}$)

$M_{ref}$ is set to $M^*_{index}$. The upper and the lower saturation limits in block 198 are set to $K1|I_d^*|$ and $-K2|I_d^*|$ respectively. These settings activate voltage loop 186. Voltage loop 186 loop is activated when $M^*_{index}$ exceeds the lower limit $M_{low}$. This lower limit can be set to any value. Typically when current regulator 160 is operating in the linear region (e.g., $M^*_{index}$<0.9069) inverter 182 has adequate voltage margin and help from voltage loop 186 is generally not required. Therefore, the lower limit $M_{low}$ may be set at the transition value between the linear and the non-linear region or slightly lower. This allows a smooth transition from the linear to the non-linear region.

The d-axis current command $I^*_d$ is calculated in block 162 to maximize the system performance while properly utilizing the bus voltage. Therefore, ideally under steady state condition $M^*_{index}$ should closely match with $M_{index}$ and no help would be needed from voltage loop 186. In other words, output $\Delta I_d$ of the saturation block 198 would be zero. However, voltage loop 186 would be needed during transient operation to overcome the additional transient voltages (e.g., from the inductive drops). Also, due to differences between the actual machine characteristics and the measured characteristics illustrated in FIGS. 16A–C, the actual modulation index $M_{index}$ is expected to be different from the commanded modulation index $M^*_{index}$. The level of deviation will depend on the error between the measured and actual machine characteristics. In such a case the voltage loop will correct the error and would allow a stable control. Therefore, the constants K1 and K2 can be set to low values. Typical values of 0.1 and 0.4 respectively or lower would be sufficient. Allowing a non-zero positive saturation limit significantly helps to bring the modulation index close to the commanded value once the output of PI block 196 becomes positive.

Case 3 ($M^*_{index} \geq M_{high}$)

If $M_{index}$ a certain pre-defined limit $M_{high}$ (see also FIG. 17), then $M_{ref}$ is set to $M_{high}$. The $M_{high}$ value basically sets the upper limit of operation in the overmodulation region. In our experiment we set this value to the 95% of six-step operation. Voltage control to full six-step would, however, not be recommended since the voltage margin between six-step operation and 95% of six-step operation is needed by the current loop to take care of any transient operation. The saturation limits of block 198 are therefore kept unchanged from the values of case 2.

The overall operation of control system function 160 of FIGS. 20A–B (carried out by system 500 of FIG. 22) is now described. The voltage loop of control function 160 comprising functions 188, 190, 192, 194, 196, 198 and the decision table described in Table I, directly modify the d-axis current of the machine to control the machine voltage. Based on torque command T*, machine speed $\omega_r$ and DC bus voltage $V_{dc}$, optimal current command table 162 generates (e.g., looks-up) the d-axis and q-axis current commands $I_d^*$, $I_q^*$ that should drive the machine most efficiently to meet these performance expectations. The d-axis command may be modified by field-weakening correction $\Delta I_d^*$ from function 186. The calculated current commands are next compared with the measured currents $I_d$, $I_q$ and PI based regulator functions 168, 170 work on the error signals to produce voltage commands and hence drive the error between the commanded and the actual current to zero. The voltage feed-forward terms (+$\omega_r$ $\psi_d^*$+$I_q^*$ $R_s$) and (−$\omega_r$ $\psi_q^*$+$I_d^*$ $R_s$), which are basically the speed voltage and the resistive drop, are added to the output of the PI regulators 168, 170 to improve the transient performance of the current regulator. An anti-windup current regulator may also be used here to minimize current overshoot but this is not essential. Anti-windup schemes are known in the art, which modifies the integrator term of PI regulator functions 168, 170, preventing them from saturating. For instance the anti-windup scheme presented in *PID Controller: Theory,*

*Design, and Tuning* by K Astrom, T Hagglund, published by Instrument Society of America, Research Triangle Park, N.C., may be implemented. The output of the current regulators (functions 168–174) are fed to over-modulation function 176 which implements the scheme as described by Holtz et el (ibid), and thence to synchronous-to-stationary frame converter function 178 wherein the synchronous frame voltage commands are converted to stationary frame voltage commands. Function 178 uses the measured or estimated rotor position $\theta_r$ for the transformation. The outputs of transformation function 178 are fed to duty cycle calculator function 180 wherein the duty cycles needed to apply the appropriate gating signals to inverter 182 are generated and passed to inverter 182, which then applies the appropriate voltages to the machine to produce the desired currents, $I_a$, $I_b$, $I_c$ ($I_a$, $I_b$, $I_c$ are stationary frame representations of the synchronous frame commanded currents $I_d^*$ and $I_q^*$) in machine 30.

Field-weakening correction module 186 modifies the d-axis current command $I_d^*$ to adjust the voltage for high-speed operation. In a PM machine the machine PM flux is not actually reduced, rather a negative d-axis demagnetizing current is applied that reduces the overall machine flux, thereby reducing the back-emf and allowing continuing control over the phase current. For strong flux machines such as the axial flux machine of the present invention, the d-axis current has strong influence on the machine voltage, therefore controlling the d-axis current to control machine voltage works well. To improve the transient as well as the steady state performance, ensure stability, and to provide for smooth transition into the over-modulation region of inverter 182, PI based feedback control module 186 is provided.

The outputs of the command current regulators (functions 168–174) are fed to modulation index calculation function 192 where the magnitude of modulation index $M_{index}$ is calculated. The individual d-axis and q-axis voltages and also the total voltages are allowed to reach the six-step voltage limit. During six-step operation the total bus voltage is applied to the machine terminal, that is the duty cycle is 1. A detailed explanation of six-step operation can be found in the text of Mohan (ibid) described earlier. The magnitude of modulation index $M_{index}$ is compared in block 194 with the magnitude of $M_{ref}$ to determine the error. $M_{ref}$ is not a fixed reference but depends upon the operating conditions. To determine $M_{ref}$ a knowledge of the modulation index command $M^*_{index}$ is needed. $M^*_{index}$ is calculated from the $I_d^{**}$ and $I_q^*$ values that are fed to flux-linkages computation function 188. The flux linkages are then fed to computation function 190 which determines $M^*_{index}$ based on the flux linkages, bus voltage $V_{dc}$, machine speed $\omega_r$, phase command currents $I_d^{**}$, $I_q^*$ and phase resistance $R_s$, according to equations [2]–[5].

When $M^*_{index}$ is below the linear region of operation of inverter 182, the rectified machine terminal voltage is lower than the DC bus voltage and the field-weakening loop (i.e., function 186) is not needed. In such case, $M_{ref}$ is set to the upper limit of the voltage loop as shown in Table I. Also, the positive saturation flux level ($I_{dsat}^+$) in function 198 is set to zero. Therefore, voltage loop 168 is disabled (i.e., the modulation index error is positive so that $\Delta I_d^*$=0) and d-axis current command $I_d^*$ from optimized function 162 is fed to current regulator 168, 170 unchanged. Once $M^*_{index}$ exceeds the linear to non-linear threshold $M_{low}$ and enters into the non-linear over-modulation region of inverter 182, the modulation index reference $M_{ref}$ is set equal to $M^*_{index}$. The current commands $I_d^*$, $I_q^*$ are calculated to maximize system performance while properly utilizing the bus voltage. Therefore, ideally under steady state conditions, $M^*_{index}$ should closely match $M_{index}$ and little or no help is needed from feedback loop 186. In other words, output $\Delta I_d^*$ of saturation function 198 would be approximately zero. However, some help from loop 186 is generally needed during transient operations for the transient voltage. Also, due to variations of the actual machine characteristics versus the measured characteristics of FIGS. 16A–C, the actual modulation index $M_{index}$ may be slightly different from the commanded modulation index $M^*_{index}$. In such case, feedback loop 186 will correct the error and allow stable control. Setting $M_{ref}=M^*_{index}$ allows very smooth transition of inverter 182 into the over-modulation region. If $M^*_{index}$ exceeds a certain pre-defined limit $M_{high}$, then $M_{ref}$ is set equal to $M_{high}$, which is basically the upper limit of operation of the over-modulation region. The $M_{high}$ value is conveniently about 95% of the six-step limit of operation, but larger or smaller values may also be used. However, voltage control to the full six-step limit is generally not desirable since the voltage margin between the full six-step limit and 95% is needed by the current loop (function s 163, 165, 168, 170, 172, 174, 176, 178, and 180) to take care of any transient operation. However, even under steady state conditions some variation between the commanded and actual modulation index may occur due to variations between the model and the actual machine and due to measurement errors. These differences are corrected by feedback loop function 186. The upper and lower limits of saturation function 198 are also set by checking $M^*_{index}$. Once $M^*_{index}$ exceeds $M_{lower}$, the upper ($I_{dsat}^+$) and lower ($I_{dsat}^-$) saturation limits of function 198 are set to ($K_1 |I_d^*|$) and ($-K_2 |I_d^*|$), respectively. The commanded and actual modulation indices should be close to each other, so $K_1$ and $K_2$ are small with typical values of $K_1$=about 0.1 and $K_2$=about 0.4, but larger or smaller values can also be used. Allowing a non-zero positive saturation limit significantly helps to bring the modulation index close to the commanded value once the output of PI function 196 becomes positive. As noted earlier, this positive limit is set to zero when the current regulator (functions 163, 165, 168, 170, 172, 174, 176, 178, and 180) is operating in the linear region, thereby disabling feedback loop 186. The above-described control system for operating machine 30 provides excellent steady-state and transient response.

Figure 21A:
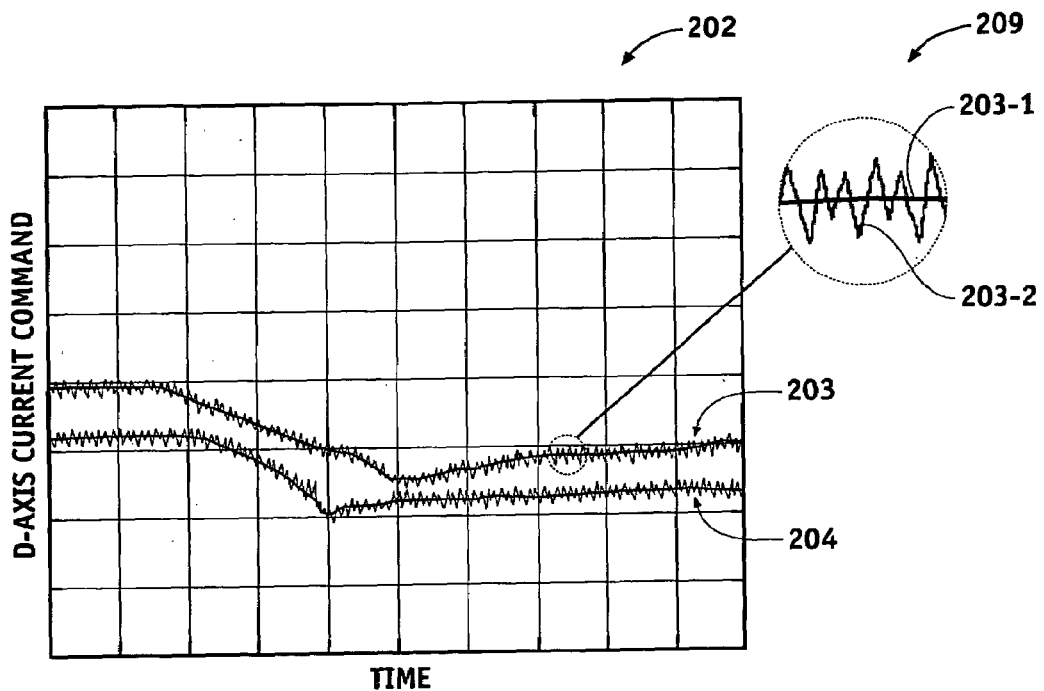
FIGS. 21A–B are plots of d-axis and q-axis current, respectively, for the motor of the present invention under several operating conditions.
Figure 21B:
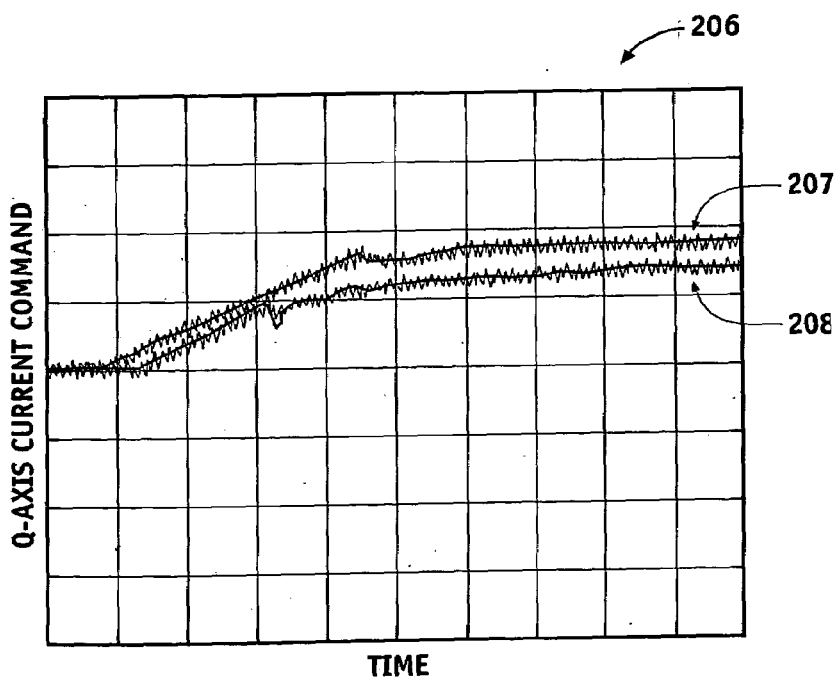

FIGS. 21A–B show plots 202, 206 of d-axis and q-axis current commands, respectively, for the motor of the present invention under several operating conditions. These plots show the anti-windup synchronous current regulator (functions 163, 165, 168, 170, 172, 174, 176, 178, and 180 (the anti-windup scheme is however not shown in FIG. 20) performance at 1200 rpm responding to a 100% (i.e., 0–500 N-m) torque transient at 250 $V_{dc}$ (curves 204, 208) and 350 $V_{dc}$ (curves 203 and 207). For curve 204 the current scale is 100 A/div and for curves 203, 204, 207 the current scale is 120 A/div. In enlarged portion 209 of curve 203, relatively slowly changing trace 203-1 shows $I_d^{}$ and rapidly changing trace 203-2 shows the measured d-axis current $I_d$. Trace 203-2 approximates $I_d$, which actually moves up and down in a stair-step fashion. Traces 204, 207, 208 exhibit a similar behavior. The actual current is accurately following the current command as can be seen in FIGS. 21A–B. For this experiment, 1200 rpm was the maximum speed of the drive. At the maximum speed the machine back-emf is much higher than the bus voltages of 250V and 350V. The feed-forward control (command output of function 162 to current regulator or controller function 185) working along with voltage feed-back loop function 186** are ensuring a stable performance of the drive even during the step command from zero to the peak machine torque of 500 N-m.

FIG. 22 is a simplified schematic diagram of computer based system 500 suitable for carrying out the control processes of the present invention. System 500 comprises control module 501 having processor 502, program, memory 504 for storing the operating instructions for carrying out control process 160, temporary memory 505 for storing variables during the operation of control module 501 and system 500, machine properties memory 506 for storing the machine properties for optimized command table of function 162 determined by method 790 and used in control process 160, output buffers 508 for coupling controller 501 to inverter 182, and input buffers 510 for receiving measured quantities 184 from measured quantities detector 512. Processor 502, memories 504, 505, 506 and I/O buffers 510, 508 are coupled by bus or leads 503. Output buffers 508 are coupled to inverter 182 via bus or leads 509. Input buffers 510 are coupled to measured quantities detector 512 by bus or leads 511. Measured quantities detector 512 receives phase current $I_a$, $I_c$ magnitudes and directions via leads 513, 514, receives machine speed and rotor angle via leads 31, and receives $V_{dc}$ via lead 515, and transmits the noted quantities to module 501 on leads 511. Inverter 182 also received $V_{dc}$ via lead 183, as previously explained. Input buffers 510 also receives the commanded torque T* provided by the user. In a vehicle application this is typically derived from the accelerator pedal position. System 500 illustrates controller 501 suitable for carrying out method 790 off line (although this is not essential) and for providing real time control of motor 30 using the sequence of operations and functions illustrated in FIGS. 20A–B.

Figure 23:
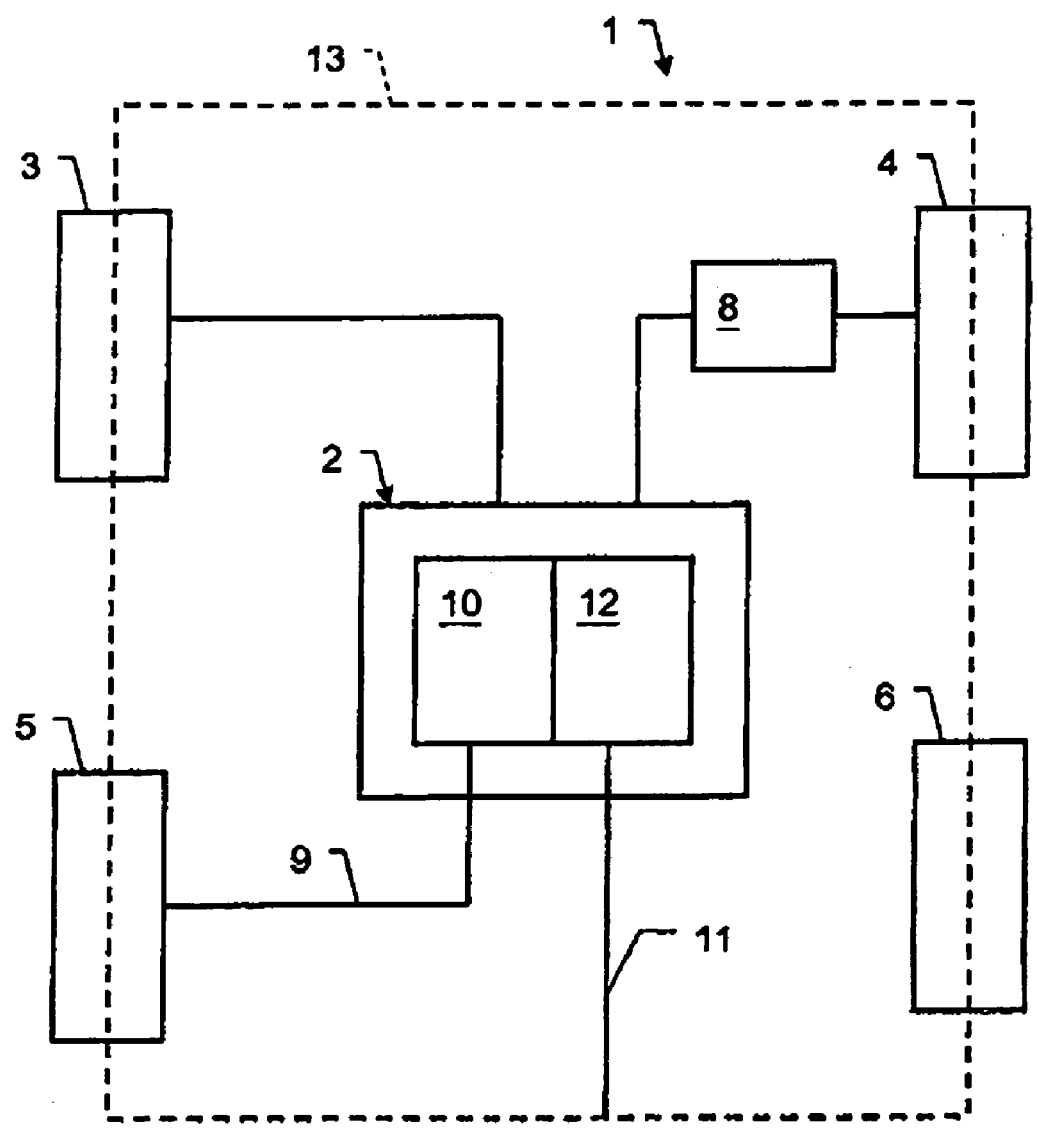
FIG. 23 is a simplified schematic diagram illustrating embodiments of the present invention.

As shown in FIG. 23, a vehicle 1 can include an axial flux permanent magnet motor 2 coupled to a plurality of wheels 3–6. The motor 2 can be coupled directly to the wheel 3, as schematically indicated by line 7, or the motor 2 can be coupled to the wheel 4 via a gear reduction 8. A first torque output, schematically indicated by line 9, can be coupled between a rotor 10 of the motor 2 and at least one of the wheels 5. A second torque output, schematically indicated by line 11, can be coupled between a stator 12 of the motor 2 and a frame 13 of the vehicle 1.

While at least one exemplary embodiment has been presented in the foregoing detailed description, it should be appreciated that a vast number of variations exist. For example, while coolant ring 88 is shown as engaging the outer circumference of annular stator 36, and this arrangement is preferred, it can alternatively or complementarily engage the inner circumference or other portions of annular stator 36 with an appropriate modification of rotor web 70. Further, while the present invention is described as being particularly adapted to direct drive of a vehicle wheel without reduction gears or the like, use of such reduction gears is not precluded. In addition, while two rotors are preferred, this is not essential and one or more rotors can be used. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electric traction vehicle, comprising:
    a vehicle having a plurality of wheels and a frame; and
    an axial flux permanent magnet motor coupled to at least one of said plurality of wheels, said motor comprising
        a stator having coils thereon adapted to produce a time varying stator magnetic field,
        a rotor having permanent magnets mounted thereon facing the stator and adapted to produce an axially directed flux,
        wherein the rotor is rotatably coupled to the stator in axial alignment therewith and rotated by the time varying stator magnetic field,
        a first torque output coupled between the rotor and the at least one wheel, and
        a second torque output coupled between the stator and the frame of the vehicle,
        wherein the rotor is washer-shaped having an inner and outer circumference and the permanent magnets are mounted circumferentially spaced apart thereon between, the inner and outer circumferences, with their principal faces on a principal face of the rotor facing the stator, and
        wherein the permanent magnets are arranged circumferentially in groups with a spacing between adjacent groups being larger than the spacing between adjacent magnets within the groups.

2. The electric traction vehicle of claim 1 wherein said axial flux permanent magnet motor is directly coupled to said wheel.

3. The electric fraction vehicle of claim 1 wherein said axial flux permanent magnet motor is coupled to said wheel through a gear reduction.

4. The electric traction vehicle of claim 1 wherein the stator coils are multiphase coils for producing the time varying magnetic field of the stator.

5. The electric traction vehicle of claim 1 wherein each permanent magnet spans approximately three stator coils.

6. The electric traction vehicle of claim 1 wherein adjacent permanent magnets have oppositely directed directions of magnetization.

7. The electric traction vehicle of claim 1 wherein the stator has a core of magnetic material on which the coils are mounted in slots in the core between pole pieces facing the permanent magnets.

8. The electric traction vehicle of claim 7 further comprising magnetic shunts bridging at least a portion of the slots between adjacent pole pieces.

9. The electric traction vehicle of claim 7 wherein the coils comprise flat ribbons whose principal surfaces are substantially perpendicular to sides of the slots retaining the coils.

10. The electric traction vehicle of claim 1 wherein the coils comprise flat ribbons a portion of whose principal surfaces are substantially parallel to principal surfaces of the permanent magnets.

11. The electric traction vehicle of claim 1 wherein at least some of the permanent magnets are tapered, being circumferentially wider toward the outer circumference of the rotor and narrower toward the inner circumference of the rotor.

12. The electric fraction vehicle of claim 1 wherein at least some of the permanent magnets have at least one straight side, and wherein the at least one straight side of the at least some adjacent magnets are not parallel.

13. The electric traction vehicle of claim 1 wherein circumferential spacing between at least some adjacent magnets decreases in going from the inner circumference to the outer circumference of the rotor.

14. The electric traction vehicle of claim 1 wherein at least some of the permanent magnets have at least one straight side, and wherein the at least one straight side of the at least some adjacent permanent magnets are not parallel to a radial vector from an axis of the rotor.

15. The electric traction vehicle of claim 1, wherein the permanent magnets are arranged circumferentially in four groups.

16. The electric fraction vehicle of claim 1, wherein the permanent magnets are arranged circumferentially in at least four groups.

17. An electric traction motor, comprising:
    a stator having coils thereon adapted to produce a time varying stator magnetic field;
    a rotor having permanent magnets mounted thereon facing the stator and adapted to produce an axially directed flux;
    wherein the rotor is rotatably coupled to the stator and rotated by the time varying stator magnetic field;
    a first torque output coupled to the rotor; and
    a second torque output coupled to the stator,
    wherein the rotor is annular-shaped having radially spaced apart inner and outer circumferences and the permanent magnets are mounted circumferentially spaced apart thereon between the inner and outer circumferences, with their principal faces on a principal face of the rotor facing the stator, and
    wherein the permanent magnets are arranged circumferentially in groups with a spacing between adjacent groups being larger than spacing between adjacent magnets within the groups.

18. The electric traction motor of claim 17 wherein the stator coils are multiphase coils for producing the time varying magnetic field of the stator.

19. The electric traction motor of claim 17 wherein each permanent magnet spans approximately three stator coils.

20. The electric traction motor of claim 17 wherein adjacent permanent magnets have oppositely directed directions of magnetization.

21. The electric traction motor of claim 17 wherein the stator has a core of magnetic material on which the coils are mounted in slots in the core between pole pieces facing the permanent magnets.

22. The electric traction motor of claim 21 further comprising magnetic shunts bridging at least in part at least a portion of the slots between adjacent pole pieces.

23. The electric traction motor of claim 21 wherein the coils comprise flat ribbons whose principal surfaces are substantially perpendicular to sides of the slots retaining the coils.

24. The electric traction motor of claim 17 wherein the coils comprise flat ribbons a portion of whose principal surfaces are, substantially parallel to principal surfaces of the permanent magnets.

25. The electric traction motor of claim 17 wherein at least some of the permanent magnets are tapered, being circumferentially wider toward the outer circumference of the rotor and narrower toward the inner circumference of the rotor.

26. The electric fraction motor of claim 17 wherein at least some of the permanent magnets have at least one straight side, and wherein the at least one straight side of the at least some adjacent permanent magnets are not parallel.

27. The electric traction motor of claim 17 wherein circumferential spacing between at least some adjacent magnets decreases in going from the inner circumference to the outer circumference of the rotor.

28. The electric traction motor of claim 17 wherein at least some of the permanent magnets have at least one straight side, and wherein the at least one straight side of the at least some adjacent permanent magnets are not parallel to a radial vector from an axis of the rotor.

29. The electric traction motor of claim 17 wherein the stator is formed from a substantially continuous strip of ferromagnetic material wound in annular shape, the strip having portions removed prior to being wound in annular shape whose locations align when wound to form slots for receiving the coils.

30. The electric traction motor of claim 17, wherein the permanent magnets are arranged circumferentially in four groups.

31. The electric traction motor of claim 17, wherein the permanent magnets re arranged circumferentially in at least four groups.

\* \* \* \* \*